(12) United States Patent
Tang et al.

(10) Patent No.: US 10,716,025 B2
(45) Date of Patent: Jul. 14, 2020

(54) COMMUNICATION METHOD, TERMINAL, AND BASE STATION

(71) Applicant: Huawei Technologies Co., Ltd., Shenzhen, Guangdong (CN)

(72) Inventors: Xun Tang, Beijing (CN); Wei Quan, Beijing (CN); Bingzhao Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 14 days.

(21) Appl. No.: 16/186,300

(22) Filed: Nov. 9, 2018

(65) Prior Publication Data
US 2019/0082346 A1    Mar. 14, 2019

Related U.S. Application Data

(63) Continuation of application No. PCT/CN2016/081905, filed on May 12, 2016.

(51) Int. Cl.
*H04W 4/00* (2018.01)
*H04W 24/10* (2009.01)
(Continued)

(52) U.S. Cl.
CPC .............. *H04W 24/10* (2013.01); *H04B 7/04* (2013.01); *H04B 7/0617* (2013.01);
(Continued)

(58) Field of Classification Search
None
See application file for complete search history.

(56) References Cited

U.S. PATENT DOCUMENTS

| 2012/0082052 A1* | 4/2012 | Oteri | H04W 24/10 370/252 |
| 2013/0258964 A1* | 10/2013 | Nam | H04W 72/046 370/329 |

(Continued)

FOREIGN PATENT DOCUMENTS

| CN | 101626265 A | 1/2010 |
| CN | 102237922 A | 11/2011 |

(Continued)

OTHER PUBLICATIONS

3GPP TR 36.824 V11.0.0 (Jun. 2012), Technical Report, 3rd Generation Partnership Project, Technical Specification Group Radio Access Network, Evolved Universal Terrestrial Radio Access (E-UTRA), LTE coverage enhancements (Release 11), 18 pages.

(Continued)

*Primary Examiner* — Clemence S Han
(74) *Attorney, Agent, or Firm* — Kilpatrick Townsend & Stockton LLP

(57) ABSTRACT

Embodiments provide a communication method, terminal, and a base station. The method includes: receiving, by terminal, a reference signal sent by a base station; and obtaining, by the terminal, channel energy of a narrow beam by measuring the reference signal, where the narrow beam is a directional beam. According to the communication method in the embodiments of the present disclosure, the terminal may obtain the channel energy of the narrow beam by measuring the reference signal. Compared with the prior art in which channel energy of a narrow beam is measured on a base station side, a difference is that the terminal can more accurately estimate the channel energy of the narrow beam. That is, the channel energy of the narrow beam estimated by the terminal can more accurately reflect channel quality, and transmission efficiency can be improved.

20 Claims, 8 Drawing Sheets

(51) Int. Cl.
*H04B 7/04* (2017.01)
*H04B 7/06* (2006.01)
*H04L 5/00* (2006.01)
*H04W 24/02* (2009.01)

(52) U.S. Cl.
CPC ......... *H04B 7/0626* (2013.01); *H04L 5/0048* (2013.01); *H04W 24/02* (2013.01)

(56) References Cited

U.S. PATENT DOCUMENTS

| | | | | |
|---|---|---|---|---|
| 2014/0334564 | A1* | 11/2014 | Singh | H04B 7/0413 375/267 |
| 2015/0010112 | A1* | 1/2015 | Liu | H04W 24/08 375/316 |
| 2015/0382205 | A1* | 12/2015 | Lee | H04W 52/365 370/329 |
| 2016/0353424 | A1* | 12/2016 | Stirling-Gallacher | H04B 7/0626 |
| 2017/0040685 | A1* | 2/2017 | Chang | H01Q 1/246 |

FOREIGN PATENT DOCUMENTS

| | | |
|---|---|---|
| CN | 104303428 A | 1/2015 |
| EP | 2645616 A2 | 10/2013 |
| WO | 2014116928 A1 | 7/2014 |

OTHER PUBLICATIONS

CATT, "Evaluation of beamformed CSI-RS with subarray TXRU mapping," R1-151364, 3GPP TSG RAN WG1 Meeting #80bis, Belgrade, Serbia, Apr. 20-24, 2015, 12 pages, XP50934239A.

Qualcomm Incorporated, "Discussion on non-precoded CSI-RS and feedback enhancements," R1-151412, 3GPP TSG-RAN WG1 #80bis, Belgrade, Serbia, Apr. 20-24, 2015, 4 pages, XP50934287A.

* cited by examiner

COMMUNICATION METHOD, TERMINAL, AND BASE STATION

CROSS-REFERENCE TO RELATED APPLICATIONS

This application is a continuation of International Application No. PCT/CN2016/081905 filed on May 12, 2016, the disclosure of which is hereby incorporated by reference in its entirety.

TECHNICAL FIELD

The present application relates to the communications field, and more specifically, to a communication method, terminal, and a base station.

BACKGROUND

Beamforming is a signal preprocessing technology based on an antenna array. In beamforming, a directional beam is generated by adjusting a weighting coefficient of each array element in the antenna array, to obtain a significant array gain. In a cellular communications system, an antenna array including a plurality of antennas is usually deployed on a base station side, and a beamforming technology is used in downlink, thereby improving communication quality of the downlink. Such a directional beam is usually referred to as a narrow beam. Comparatively, if a base station uses a relatively small quantity of transmit antennas and does not use the beamforming technology, downlink transmission patterns of the base station are collectively referred to as wide beams.

In the prior art, the base station completes an energy estimation of a narrow beam by using an uplink pilot signal. Due to a difference between an uplink channel and a downlink channel, channel energy estimation of the narrow beam may be inaccurate, affecting transmission efficiency.

SUMMARY

Embodiments of the present disclosure provide a communication method, user equipment, and a base station, to more accurately estimate channel energy of a narrow beam, thereby improving transmission efficiency.

According to a first aspect, a communication method is provided. The method includes: receiving, by user equipment, a reference signal sent by a base station; and obtaining, by the user equipment, channel energy of a narrow beam by measuring the reference signal, where the narrow beam is a directional beam.

In an embodiment of the present disclosure, the user equipment may obtain the channel energy of the narrow beam by measuring the reference signal. Compared with the prior art in which channel energy of a narrow beam is measured on a base station side, a difference is that the user equipment can more accurately estimate the channel energy of the narrow beam. That is, the channel energy of the narrow beam estimated by the user equipment can more accurately reflect channel quality, and transmission efficiency can be improved.

In a possible implementation, the reference signal is a demodulation reference signal (DMRS).

When the user equipment is in a downlink beamforming communication mode, the channel energy of the narrow beam may be obtained by measuring the DMRS.

In a possible implementation, the receiving, by user equipment, a reference signal sent by a base station includes: receiving, by the user equipment, channel state information reference signals (CSI-RS) that are sent by the base station by using N CSI-RS ports and that are respectively weighted by using N weight values, where the N CSI-RS ports correspond one-to-one to the N weight values, the N weight values are different from each other, and the N weight values correspond one-to-one to beams in N directions; and the obtaining, by the user equipment, channel energy of a narrow beam by measuring the reference signal includes: obtaining, by the user equipment, channel energy of N first beams by measuring the CSI-RSs that are weighted by using the N weight values; and determining, by the user equipment, a channel energy with a largest value in the channel energies of the N first beams as the channel energy of the narrow beam.

When the user equipment is not in a downlink beamforming communication mode, the channel energy of the narrow beam may be obtained by measuring the weighted CSI-RSs.

In a possible implementation, the receiving, by user equipment, a reference signal sent by a base station includes: receiving, by the user equipment, an unweighted cell-specific reference signal (CRS) and/or an unweighted CSI-RS that are/is transmitted by the base station by using each antenna; and the obtaining, by the user equipment, channel energy of a narrow beam by measuring the reference signal includes: obtaining, by the user equipment, a channel estimation value of each antenna by measuring the unweighted CRS and/or the unweighted CSI-RS; obtaining, by the user equipment by performing a multiplication operation on the channel estimation values and each of M weight values in a preset codebook, channel energy of M second beams that corresponds one-to-one to the M weight values; and determining, by the user equipment, a channel energy with a largest value in the channel energies of the M second beams as the channel energy of the narrow beam.

When the user equipment is not in a downlink beamforming communication mode, the channel energy of the narrow beam may alternatively be obtained by measuring the unweighted CRS and/or the unweighted CSI-RS.

In a possible implementation, the method further includes: obtaining, by the user equipment, channel energy of a wide beam by measuring an unweighted CRS or an unweighted CSI-RS; and obtaining, by the user equipment, a beam gain, where the beam gain is a ratio of the channel energy of the narrow beam to the channel energy of the wide beam.

In a possible implementation, the method further includes: reporting, by the user equipment, a D1 event to the base station, where the D1 event indicates that the beam gain is greater than a first preset threshold.

The beam gain is introduced in reporting of a measurement event, so that the base station can grasp more information of the user equipment, facilitating the base station to make a better handover decision in subsequent cell handover.

In a possible implementation, the method further includes: when the beam gain satisfies that duration of an entry condition of a first event is greater than a first time to trigger (TTT), reporting, by the user equipment, the first event to the base station, where the first time to trigger TTT is a preconfigured TTT, and the entry condition of the first event is determined by the user equipment based on the beam gain.

The beam gain is introduced in reporting of a measurement event, so that the base station can grasp more information of the user equipment, facilitating the base station to make a better handover decision in subsequent cell handover.

In a possible implementation, the first time to trigger TTT is a product of a preconfigured TTT and a speed state scale factor, where the speed state scale factor corresponds to a moving speed of the user equipment.

In a possible implementation, when the beam gain satisfies that duration of an entry condition of an A3 event is greater than a second time to trigger TTT, the user equipment reports the A3 event to the base station, the second time to trigger TTT is a product of a beam gain scale factor and a preconfigured TTT, and the beam gain scale factor corresponds to the beam gain.

In a possible implementation, when the beam gain satisfies that duration of an entry condition of a first event is greater than a third time to trigger TTT, the user equipment reports the first event to the base station, the third time to trigger TTT is a product of a beam gain scale factor and a preconfigured TTT, the beam gain scale factor corresponds to the beam gain, and the entry condition of the first event is determined by the user equipment based on the beam gain.

A TTT in the prior art is adjusted by using the beam gain, so that the base station may delay handover, thereby reducing a ping-pong handover probability.

In a possible implementation, the entry condition of the first event is:

$$Mn+Ofn+Ocn-\text{Hys}>Mp+Ofp+Ocp+\text{Off}+\Delta SINR,$$

where Mn represents a measurement result of a neighboring cell, Mp represents a measurement result of a serving cell, Ofn represents a frequency-related offset value of the neighboring cell, Ofo represents a frequency-related offset value of the serving cell, Ocn represents a related offset value of the neighboring cell, Ocp represents a related offset value of the serving cell, Hys represents a hysteresis parameter, Off represents a preset offset value of the first event, ΔSINR represents the beam gain, the base station is a base station of the serving cell, and the neighboring cell is a cell neighboring to the serving cell.

In a possible implementation, the method further includes: determining, by the user equipment, a CSI-RS port corresponding to the channel energy of the narrow beam; and sending, by the user equipment, a first identifier identifying the CSI-RS port to the base station, so that the base station determines a beamforming communication mode based on the first identifier, and communicates with the user equipment by using the beamforming communication mode.

Based on the first identifier reported by the user equipment that is not in a downlink beamforming communication mode, the base station may determine an optimal beam used for downlink communication, enable a beamforming communication mode of the user equipment, and communicate with the user equipment by using the optical beam, thereby improving communication quality.

In a possible implementation, the method further includes: obtaining, by the user equipment, channel energy of a wide beam by measuring an unweighted CRS or an unweighted CSI-RS; and obtaining, by the user equipment, a beam gain, where the beam gain is a ratio of the channel energy of the narrow beam to the channel energy of the wide beam.

In a possible implementation, the method further includes: reporting, by the user equipment, a D2 event to the base station, where the D2 event indicates that the beam gain is greater than a second preset threshold.

The beam gain is introduced in reporting of a measurement event, so that the base station can grasp more information of the user equipment, facilitating the base station to make a better handover decision in subsequent cell handover.

In a possible implementation, the method further includes: determining, by the user equipment, a codebook index corresponding to the channel energy of the narrow beam; and sending, by the user equipment, a second identifier identifying the codebook index to the base station, so that the base station determines a beamforming communication mode based on the second identifier, and communicates with the user equipment by using the beamforming communication mode, thereby improving communication quality.

Based on the second identifier reported by the user equipment that is not in a downlink beamforming communication mode, the base station may determine an optimal beam used for downlink communication, enable a beamforming communication mode of the user equipment, and communicate with the user equipment by using the optical beam.

In a possible implementation, the method further includes: obtaining, by the user equipment, channel energy of a wide beam by measuring an unweighted CRS or an unweighted CSI-RS; and obtaining, by the user equipment, a beam gain, where the beam gain is a ratio of the channel energy of the narrow beam to the channel energy of the wide beam.

In a possible implementation, the method further includes: reporting, by the user equipment, a D3 event to the base station, where the D3 event indicates that the beam gain is greater than a third preset threshold.

The beam gain is introduced in reporting of a measurement event, so that the base station can grasp more information of the user equipment, facilitating the base station to make a better handover decision in subsequent cell handover.

In a possible implementation, the method further includes: reporting, by the user equipment, an A3 event to the base station.

In a possible implementation, the method further includes: receiving, by the user equipment, a handover command sent by the base station; and handing over, by the user equipment, from the serving cell to a target cell according to the handover command, where the target cell is a cell neighboring to the serving cell, and the base station is the base station of the serving cell.

In a possible implementation, the method further includes: communicating, by the user equipment, with the base station by using a beamforming communication mode in a process of handover from the serving cell to the target cell.

In an embodiment of the present disclosure, in a process of cell handover, the base station may still maintain communication with the UE by using the beamforming communication mode, to maintain better communication quality in the handover process, and also avoid data interruption.

In a possible implementation, the method further includes: sending, by the user equipment, gain information to the base station, where the gain information includes the beam gain.

In a possible implementation, the method further includes: receiving, by the user equipment, a first signal sent by the serving cell and a second signal sent by the target cell; obtaining, by the user equipment by performing weighted processing on the first signal by using K preconfigured weight values, channel energy of K third beams that correspond one-to-one to the K preconfigured weight values, and obtaining, by performing weighted processing on the second signal by using the K preconfigured weight values, channel energy of K fourth beams that correspond one-to-one to the K preconfigured weight values, where the K preconfigured weight values correspond one-to-one to K beams, and the K preconfigured weight values are different from each other; determining, by the user equipment, a beam corresponding to a channel energy with a largest value in the channel energies of the K third beams as a first receive beam, and determining a beam corresponding to a channel energy with a largest value in the channel energies of the K fourth beams as a second receive beam; receiving, by the user equipment by using the first receive beam, a signal sent by the serving cell; and/or receiving, by the user equipment by using the second receive beam, a signal sent by the target cell.

The user equipment in handover may receive signals separately sent by the serving cell and the target cell. Because the serving cell and the target cell are in a co-frequency scenario, interference exists between data flows of the two cells. In this case, the user equipment on a receiving side may alternatively perform receiving in a beam domain, that is, first perform weighted processing on a received signal by using a preconfigured weight value, then perform energy detection, and complete beam selection of a related cell by comparing energy values. Because the user equipment is at a cell edge, a relatively large angle exists between two beams of the target base station (the base station of the target cell) and the source base station (the base station of the serving cell). In this case, even if there is a relatively small quantity of receive antennas on the user equipment side, the two beams also can be effectively distinguished.

According to a second aspect, a communication method is provided. The method includes: receiving, by a source base station, a gain event reported by user equipment, where the gain event indicates that a beam gain of a serving cell is greater than a preset threshold, the source base station is a base station of the serving cell, the beam gain of the serving cell is a ratio of channel energy of a narrow beam of the serving cell to channel energy of a wide beam of the serving cell, and the narrow beam of the serving cell is a directional beam.

According to the method in this embodiment of the present disclosure, the beam gain is introduced in reporting of a measurement event, so that the source base station can grasp more information of the user equipment, facilitating the source base station to make a better handover decision in subsequent cell handover.

In a possible implementation, the method further includes: receiving, by the source base station, an A3 event reported by the user equipment; and sending, by the source base station, a handover command to the user equipment after a preset time period based on the A3 event, to control handover of the user equipment from the serving cell to a target cell.

When receiving the gain event reported by the user equipment and receiving the A3 event reported by the user equipment, the source base station may delay handover. The beam gain is introduced in reporting of a measurement event (for example, the gain event), so that a ping-pong handover probability can be reduced.

In a possible implementation, an entry condition of the A3 event is determined by the user equipment based on the beam gain.

In an embodiment of the present disclosure, the beam gain may alternatively be introduced in reporting of an A3 event, facilitating the source base station to make a better handover decision.

In a possible implementation, the method further includes: communicating, by the source base station, with the user equipment by using a first beamforming communication mode in a process of handover of the user equipment from the serving cell to the target cell, where the serving cell is neighboring to the target cell.

In an embodiment of the present disclosure, in a process of cell handover, the source base station may still maintain communication with UE by using the beamforming communication mode, to maintain better communication quality in the handover process, and also avoid data interruption.

In a possible implementation, before the sending, by the source base station, a handover command to the user equipment, the method further includes: receiving, by the source base station, a first identifier sent by the user equipment, where the first identifier is used to indicate a first channel state information reference signal CSI-RS port corresponding to the source base station, and the first CSI-RS port corresponds to the channel energy of the narrow beam of the serving cell; and before the communicating, by the source base station, with the user equipment by using a first beamforming communication mode, the method further includes: determining, by the source base station, the first beamforming communication mode based on the first identifier.

Based on the first identifier reported by the user equipment that is not in a downlink beamforming communication mode, the source base station may determine an optimal beam used for downlink communication, enable a beamforming communication mode of the user equipment, and communicate with the user equipment by using the optical beam, thereby improving communication quality.

In a possible implementation, before the sending, by the source base station, a handover command to the user equipment, the method further includes: receiving, by the source base station, a second identifier sent by the user equipment, where the second identifier is used to indicate a first codebook index, and the first codebook index corresponds to the channel energy of the narrow beam of the serving cell; and before the communicating, by the source base station, with the user equipment by using a first beamforming communication mode, the method further includes: determining, by the source base station, the first beamforming communication mode based on the second identifier.

Based on the second identifier reported by the user equipment that is not in a downlink beamforming communication mode, the source base station may determine an optimal beam used for downlink communication, enable a beamforming communication mode of the user equipment, and communicate with the user equipment by using the optical beam, thereby improving communication quality.

In a possible implementation, the method further includes: receiving, by the source base station, a third identifier sent by the user equipment, where the third identifier is used to indicate a second CSI-RS port corresponding to a target base station, the target base station is a base station of the target cell, the second CSI-RS port corresponds to channel energy of a narrow beam of the target cell, a beam gain of the target cell is a ratio of the channel energy of the narrow beam of the target cell to channel energy of a wide beam of the target cell, and the narrow beam of the target cell is a directional beam; and sending, by the source base station, the third identifier to the target base station, so that the target base station determines a second beamforming communication mode based on the third identifier, and communicates with the user equipment by using the second beamforming communication mode.

In a possible implementation, the method further includes: receiving, by the source base station, a fourth identifier sent by the user equipment, where the fourth identifier is used to indicate a second codebook index corresponding to a target base station, the target base station is a base station of the target cell, the second codebook index corresponds to channel energy of a narrow beam of the target cell, a beam gain of the target cell is a ratio of the channel energy of the narrow beam of the target cell to channel energy of a wide beam of the target cell, and the narrow beam of the target cell is a directional beam; and sending, by the source base station, the fourth identifier to the target base station, so that the target base station determines a second beamforming communication mode based on the fourth identifier, and communicates with the user equipment by using the second beamforming communication mode.

In a possible implementation, the method further includes: receiving, by the source base station, first gain information sent by the user equipment, where the first gain information includes the beam gain of the serving cell.

In a possible implementation, the method further includes: receiving, by the source base station, second gain information sent by the user equipment, where the second gain information includes the beam gain of the target cell, the beam gain of the target cell is the ratio of the channel energy of the narrow beam of the target cell to the channel energy of the wide beam of the target cell, and the narrow beam of the target cell is a directional beam; and sending, by the source base station, the second gain information to the target base station.

In a conventional handover process, after receiving the handover command sent by the serving cell, the UE immediately stops communication with the serving cell, and starts a random access process for the target cell at the same time. However, in a solution in which the UE simultaneously communicates with the serving cell and the target cell, after receiving the handover command, the UE only starts to perform a random access process of the target cell, and does not interrupt communication with the serving cell. Because UE to be handed over is usually at a cell edge, communication quality is usually relatively poor. Even if the UE simultaneously communicates with two cells, a data rate finally obtained by the UE is not high. In this embodiment of the present disclosure, in a process of cell handover, the base station may still maintain communication with UE by using the beamforming communication mode, to maintain better communication quality in the handover process, and also avoid data interruption.

According to a third aspect, a communication method is provided. The method includes: receiving, by a base station, an uplink signal sent by user equipment; determining, by the base station, an uplink signal to interference plus noise ratio (SINR) based on the uplink signal; and when the uplink SINR is greater than a preset threshold, determining, by the base station, to configure a padding skipping function for the user equipment.

In an embodiment of the present disclosure, the base station may determine, by comparing the uplink SINR with the preset threshold, whether to configure the padding skipping function for the user equipment. This can ensure that the padding skipping function is enabled only when the uplink SINR is high, to ensure reliability of discontinuous transmission (DTX) detection.

In a possible implementation, the uplink signal includes at least one of the following signals: a physical random access channel (PRACH) signal, a physical uplink control channel (PUCCH) signal, a demodulation reference signal DMRS, and a sounding reference signal (SRS).

In a possible implementation, the determining, by the base station, that a padding skipping function is configured for the user equipment includes: configuring, the base station, the padding skipping function by sending configuration information to the user equipment.

According to a fourth aspect, a communication method is provided. The method includes: receiving, by user equipment, a cell-specific reference signal CRS and/or a channel state information reference signal CSI-RS that are/is sent by a base station; determining, by the user equipment, a downlink SINR by measuring the CRS and/or the CSI-RS; and when the downlink SINR is less than a preset threshold, sending, by the user equipment, indication information to the base station, where the indication information is used to instruct the base station to disable a padding skipping function of the user equipment.

In an embodiment of the present disclosure, after the padding skipping function of the user equipment is enabled, if the downlink SINR of the user equipment is less than the preset threshold, that is, the user equipment enters a low downlink SINR state, it is considered that the user equipment is also in a low uplink SINR state. In this case, the user equipment may instruct the base station to disable the padding skipping function of the user equipment by sending the indication information to the base station. In this way, it can be ensured that the padding skipping function is enabled only when an uplink SINR is high, to ensure reliability of DTX detection.

In a possible implementation, the sending, by the user equipment, indication information to the base station includes: sending, by the user equipment, a padding packet to the base station when no data is to be sent (a cache of the user equipment is empty).

In a possible implementation, the sending, by the user equipment, indication information to the base station includes: sending, by the user equipment, a Media Access Control control element (MAC CE) to the base station, where the MAC CE indicates that the downlink SINR is less than or equal to the preset threshold.

In a possible implementation, the sending, by the user equipment, indication information to the base station includes: sending, by the user equipment, particular information by using a PUCCH, where the particular information includes at least one of a scheduling request (Scheduling Request, SR), an acknowledgement (ACK) frame, an NACK frame, a channel quality indication (CQI), and the CQI is obtained after the user equipment measures the CRS and/or the CSI-RS.

In a possible implementation, before the receiving, by user equipment, a cell reference signal CRS and/or a channel state information reference signal CSI-RS that are/is sent by a base station, the method further includes: receiving, by the user equipment, a Radio Resource Control (RRC) message sent by the base station, where the RRC message includes the preset threshold.

According to a fifth aspect, a communication method is provided. The method includes: sending, by a base station, a cell reference signal CRS and/or a channel state information reference signal CSI-RS to user equipment; receiving, by the base station, indication information sent by the user equipment based on the CRS and/or the CSI-RS; and determining, by the base station based on the indication information, to disable a padding skipping function of the user equipment.

In a possible implementation, the receiving, by the base station, indication information sent by the user equipment based on the CRS and/or the CSI-RS includes: receiving, by the base station, a padding packet sent by the user equipment based on the CRS and/or the CSI-RS, where the user equipment does not send data when sending the padding packet.

In a possible implementation, the receiving, by the base station, indication information sent by the user equipment based on the CRS and/or the CSI-RS includes: receiving, by the base station, a MAC CE sent by the user equipment based on the CRS and/or the CSI-RS, where the MAC CE indicates that a downlink SINR is less than or equal to a preset threshold, and the downlink SINR is determined by the user equipment by measuring the CRS and/or the CSI-RS.

In a possible implementation, the receiving, by the base station, indication information sent by the user equipment based on the CRS and/or the CSI-RS includes: receiving, by the base station, particular information sent by the user equipment based on the CRS and/or the CSI-RS by using a PUCCH, where the particular information includes at least one of an SR, an ACK/NACK, and a CQI.

In a possible implementation, before the sending, by a base station, a cell reference signal CRS and/or a channel state information reference signal CSI-RS to user equipment, the method further includes: sending, by the base station, a Radio Resource Control RRC message to the user equipment, where the RRC message includes the preset threshold.

According to a sixth aspect, user equipment is provided. The user equipment is configured to perform the method according to the first aspect or any possible implementation of the first aspect. Specifically, the user equipment includes a unit configured to perform the method according to the first aspect or any possible implementation of the first aspect.

According to a seventh aspect, a base station is provided. The base station is configured to perform the method according to the second aspect or any possible implementation of the second aspect. Specifically, the base station includes a unit configured to perform the method according to the second aspect or any possible implementation of the second aspect.

According to an eighth aspect, a base station is provided. The base station is configured to perform the method according to the third aspect or any possible implementation of the third aspect. Specifically, the base station includes a unit configured to perform the method according to the third aspect or any possible implementation of the third aspect.

According to a ninth aspect, user equipment is provided. The user equipment is configured to perform the method according to the fourth aspect or any possible implementation of the fourth aspect. Specifically, the user equipment includes a unit configured to perform the method according to the fourth aspect or any possible implementation of the fourth aspect.

According to a tenth aspect, a base station is provided. The base station is configured to perform the method according to the fifth aspect or any possible implementation of the fifth aspect. Specifically, the base station includes a unit configured to perform the method according to the fifth aspect or any possible implementation of the fifth aspect.

According to an eleventh aspect, user equipment is provided. The user equipment includes a processor, a transceiver, and a memory. The memory is configured to store an instruction. The processor is configured to execute the instruction stored in the memory. The transceiver is configured to communicate with a base station. When executing the instruction stored in the memory, the processor is configured to perform the method according to the first aspect or any possible implementation of the first aspect.

According to a twelfth aspect, a base station is provided. The base station includes a processor, a transceiver, and a memory. The memory is configured to store an instruction. The processor is configured to execute the instruction stored in the memory. The transceiver is configured to communicate with user equipment. When executing the instruction stored in the memory, the processor is configured to perform the method according to the second aspect or any possible implementation of the second aspect.

According to a thirteenth aspect, a base station is provided. The base station includes a processor, a transceiver, and a memory. The memory is configured to store an instruction. The processor is configured to execute the instruction stored in the memory. The transceiver is configured to communicate with user equipment. When executing the instruction stored in the memory, the processor is configured to perform the method according to the third aspect or any possible implementation of the third aspect.

According to a fourteenth aspect, user equipment is provided. The user equipment includes a processor, a transceiver, and a memory. The memory is configured to store an instruction. The processor is configured to execute the instruction stored in the memory. The transceiver is configured to communicate with a base station. When executing the instruction stored in the memory, the processor is configured to perform the method according to the third aspect or any possible implementation of the third aspect.

According to a fifteenth aspect, a base station is provided. The base station includes a processor, a transceiver, and a memory. The memory is configured to store an instruction. The processor is configured to execute the instruction stored in the memory. The transceiver is configured to communicate with user equipment. When executing the instruction stored in the memory, the processor is configured to perform the method according to the fourth aspect or any possible implementation of the fourth aspect.

BRIEF DESCRIPTION OF THE DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DETAILED DESCRIPTION

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

It should be understood that, the technical solutions in the embodiments of the present disclosure may be applied to various communications systems, such as a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD) system, a Universal Mobile Telecommunications System (UMTS), and a Worldwide Interoperability for Microwave Access (WiMAX) communications system.

It should further be understood that, in the embodiments of the present disclosure, user equipment (UE) may be referred to as a terminal, a mobile station (MS), a mobile terminal, or the like. The user equipment may communicate with one or more core networks by using a radio access network (RAN). For example, the user equipment may be a mobile phone (or referred to as a "cellular" phone) or a computer having a mobile terminal. For example, the user equipment may alternatively be a portable, pocket-sized, handheld, computer built-in, or in-vehicle mobile apparatus, which exchanges voice and/or data with the radio access network.

In the embodiments of the present disclosure, a base station may be a base transceiver station (BTS) in GSM or CDMA, or may be a NodeB (NB) in WCDMA, or may be an evolved NodeB (eNB or e-NodeB) in LTE. This is not limited in the present disclosure. For ease of description, the following embodiments are described by using a base station eNB and user equipment UE as an example.

Figure 1:
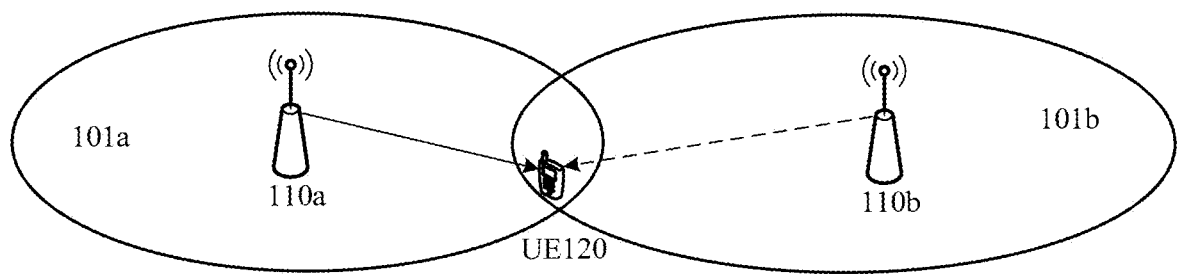
FIG. 1 is a schematic structural diagram of a communications system to which a communication method may be applied according to an embodiment of the present disclosure.

FIG. 1 is a schematic structural diagram of a communications system to which a communication method may be applied according to an embodiment of the present disclosure. The communications system in FIG. 1 includes a source base station 110a controlling a serving cell 101a, a target base station 110b controlling a target cell 101b, and UE 120, and quantities of the source base stations 110a, the target base stations 110b, and the UEs 120 in the communications system are not limited in the present disclosure.

The serving cell is a current serving cell of the UE 120. In a connected mode, a communications link is established between the source base station 110a and the UE 120, and a call and/or data transmission are/is being performed by using the communications link.

When the source base station 110a determines, based on a received measurement report reported by the UE 120, that the UE 120 needs to be handed over from the serving cell to the target cell and the target base station 110b agrees to the handover of the UE 120, the source base station 110a sends a handover command to the UE 120. After receiving the handover command, the UE 120 starts the handover from the serving cell 101a to the target cell 101b.

Figure 2:
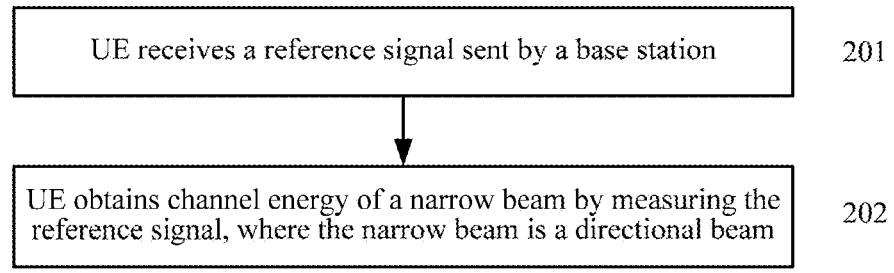
FIG. 2 is a schematic flowchart of a communication method according to an embodiment of the present disclosure.

FIG. 2 is a schematic flowchart of a communication method according to an embodiment of the present disclosure. The method may be applied to the network shown in FIG. 1. However, this is not limited in this embodiment of the present disclosure.

201. UE receives a reference signal sent by a base station.

202. UE obtains channel energy of a narrow beam by measuring the reference signal, where the narrow beam is a directional beam.

It should be understood that the UE may be the UE 120 shown in FIG. 1, and the base station may be the source base station 110a shown in FIG. 1.

Specifically, the UE may perform channel estimation on the received reference signal, and obtains the channel energy of the narrow beam based on a result of the channel estimation.

In this embodiment of the present disclosure, the UE may obtain the channel energy of the narrow beam by measuring the reference signal. Compared with the prior art in which channel energy of a narrow beam is measured on a base station side, a difference is that the UE can more accurately estimate the channel energy of the narrow beam. That is, the channel energy of the narrow beam estimated by the UE can more accurately reflect channel quality, and transmission efficiency can be improved.

Optionally, the reference signal may be a demodulation reference signal DMRS.

In other words, in 201, the UE receives a DMRS sent by the base station; and in 202, the UE obtains the channel energy of the narrow beam by measuring the DMRS.

Specifically, for the UE in a downlink beamforming communication mode, for example, UE in a TM 9 mode in an LTE system, channel estimation may be directly performed by using the DMRS. Because the base station already performs weighting on the DMRS at a transmit end, and a used weight value is the same as a weight value used by data, most accurate channel energy of beamforming can be directly obtained through channel estimation on the DMRS, namely, the channel energy of the narrow beam.

Optionally, in 201, the UE may receive CSI-RSs that are sent by the base station by using N channel state information reference signal CSI-RS ports and that are respectively weighted by using N weight values. The N CSI-RS ports correspond one-to-one to the N weight values, the N weight values are different from each other, and the N weight values correspond one-to-one to beams in N directions. In 202, the UE may obtain channel energy of N first beams by measuring the CSI-RSs that are weighted by using the N weight values. The UE determines a channel energy with a largest value in the channel energies of the N first beams as the channel energy of the narrow beam.

Specifically, for the UE not in the beamforming communication mode, the channel energy of the narrow beam may be obtained by measuring a common pilot. If there are downlink CSI-RSs, and the CSI-RSs of different ports are already weighted by using corresponding weight values (different weight values correspond to beams in different directions), the channel energy of the narrow beam may be calculated by directly using the CSI-RSs.

By using an LTE system as an example, for downlink CSI-RSs of eight ports, a beam direction may be specified for each port, and the CSI-RSs are multiplied by corresponding weight values before the CSI-RSs are sent. When receiving the CSI-RSs, the UE performs channel estimation for the CSI-RS of each port and calculates channel energy, and selects largest channel energy from the channel energy and uses the largest channel energy as the channel energy of the narrow beam. Meanwhile, UE may also determine a CSI-RS port corresponding to the largest channel energy.

Optionally, in 201, the UE may receive an unweighted CRS or an unweighted CSI-RS sent by the base station by using each antenna. In 202, the UE may obtain a channel estimation value of each antenna by measuring the unweighted CRS or the unweighted CSI-RS. The UE obtains, by performing a multiplication operation on the channel estimation values and each of M weight values in a preset codebook, channel energy of M second beams that corresponds one-to-one to the M weight values. The UE determines a channel energy with a largest value in the channel energies of the M second beams as the channel energy of the narrow beam.

Specifically, for the UE not in a beamforming communication mode, if a system has no pilot on which weighted processing is performed, channel estimation may be performed by using an unweighted pilot, for example, the CRS or the CSI-RS, and an energy estimation of the narrow beam may be performed by multiplying a result of the channel estimation and the preset codebook.

Because the CRSs or the CSI-RSs correspond to a relatively small quantity of ports, but a quantity of antennas is far greater than the quantity of ports. For example, the CRSs correspond to a maximum of four ports, the CSI-RSs correspond to a maximum of eight ports, and there are 128 antennas. In this case, downlink pilots may be transmitted by using different antennas in a frequency division or time division manner.

For example, for the CRSs corresponding to four ports, a full bandwidth may be divided into five segments, and the CRSs corresponding to four ports are transmitted by using four antennas in each segment. In this way, 20 antennas may be used in one subframe. If there are 100 antennas in total, channel estimation of the 100 antennas may be traversed by using five subframes. If a longer traverse period is designed, for example, 25 subframes, channel estimation of the full bandwidth of each antenna may be obtained. Based on obtained channel estimation of all antennas, with reference to a preconfigured codebook, channel energy of each weight value (beam) in the codebook may be estimated, and largest channel energy is selected from the channel energy and is used as the channel energy of the narrow beam. Meanwhile, UE may also determine a codebook index corresponding to the channel energy of the narrow beam.

Figure 3:
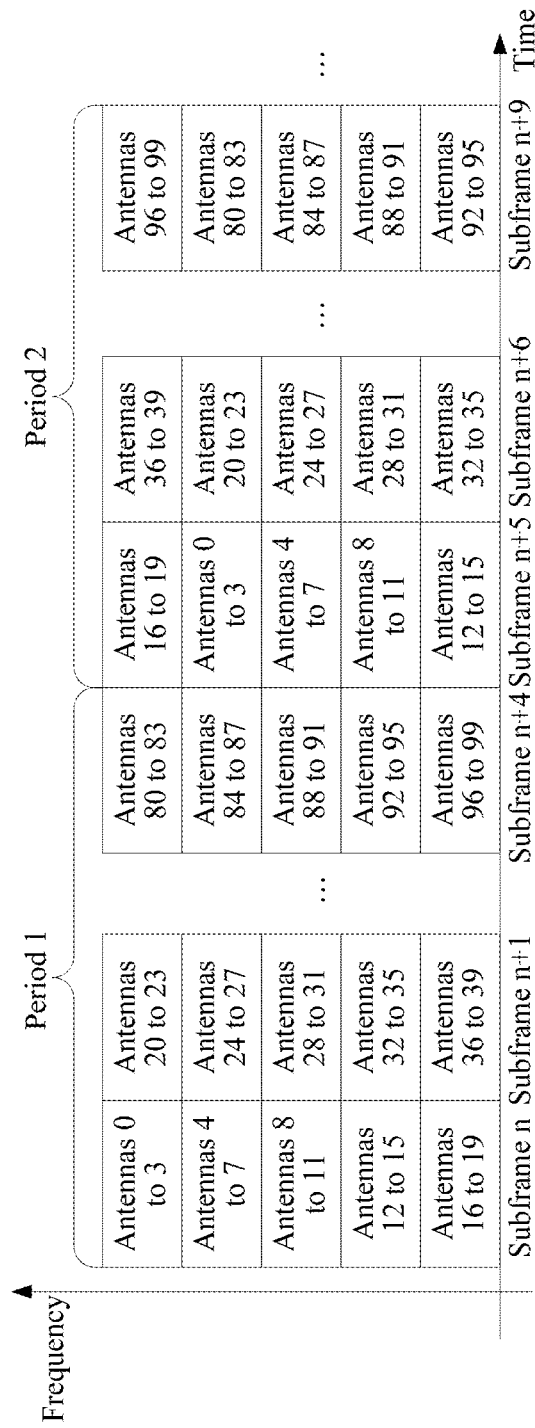
FIG. 3 is a schematic structural diagram of a method for channel estimation according to an embodiment of the present disclosure.

Before the foregoing measurement is performed, the base station may indicate a measurement configuration parameter to the UE. For example, the base station may use a manner similar to semi-persistent scheduling (SPS). The base station first notifies the UE of a measurement period for measurement and a quantity of frequency bands divided in each subframe by using a Radio Resource Control (RRC) message, and activates and releases a measurement mode by adding a scheduling command to a physical downlink control channel (PDCCH). If each antenna needs to traverse the full bandwidth, an offset may be notified in the RRC message. A schematic diagram of possible resource allocation is shown in FIG. 3. There are four pilot ports, the measurement period is five subframes, each subframe is divided into five frequency bands, and the offset is set to an offset of one frequency band for each time.

Optionally, the method may further include: The UE obtains channel energy of a wide beam by measuring the unweighted CRS or the unweighted CSI-RS; and the UE obtains a beam gain, where the beam gain is a ratio of the channel energy of the narrow beam to the channel energy of the wide beam.

Because full cell coverage of the CRS needs to be considered, the CRS is usually sent by using the wide beam without weighted processing. Therefore, the channel energy of the wide beam can be obtained through a channel estimation of the CRS. A gain of the narrow beam relative to the wide beam can be obtained by dividing the channel energy of the narrow beam by the channel energy of the wide beam, namely, a beamforming gain, which is referred to as a beam gain.

A possible calculation formula is as follows:

$$\Delta SINR = \frac{\|\overline{H}W_{BF}\|_F^2}{\|\overline{H}W_{wide}\|_F^2},$$

where $\overline{H}$ is a channel estimation result, $W_{BF}$ is a weight value of the narrow beam, $W_{wide}$ is a weight value of the wide beam, $\|\cdot\|_F^2$ is an F-norm (a quadratic sum of elements in a matrix), and $\Delta SINR$ is a gain value of the narrow beam relative to the wide beam.

For the UE already in a downlink beamforming communication mode, $\overline{H}W_{BF}$ may be directly obtained by measuring the DMRS, and $\overline{H}W_{wide}$ may be directly obtained by measuring the CRS. In addition, the beam gain is measured by using the DMRS, and a more accurate measurement result for the UE can be obtained.

For the UE not in the beamforming communication mode, $\overline{H}W_{BF}$ may also be obtained by using the foregoing two solutions. Similarly, $\overline{H}W_{wide}$ may be directly obtained by measuring the CRS, and the beam gain may be further obtained. It should be understood that for the UE not in the beamforming communication mode, the obtained $\overline{H}W_{BF}$ is the channel energy of the narrow beam estimated by the UE, but is not actual channel energy of the narrow beam.

It should be understood that in the foregoing measurement, the channel energy of the wide beam may alternatively be obtained by measuring the unweighted CSI-RS. This is not limited in this embodiment of the present disclosure.

It should be noted that the method for measuring the beam gain of the UE not in the beamforming communication mode is also applicable to a scenario in which a signal of a neighboring cell is measured by the UE. In this case, a configuration of a CSI-RS or a CRS of the neighboring cell is indicated by a measurement configuration RRC message of a current cell (namely, the serving cell). A measurement result of the UE is also fed back to the cell, and the measurement result is sent to a base station corresponding to a target cell (namely, the target base station) by a base station corresponding to the current cell.

The channel energy of the narrow beam and the beam gain that are obtained through measurement by the UE in the foregoing embodiment of the present disclosure may be directly used for reporting of a measurement event in a cell handover process. In addition, the beam gain is introduced in reporting of the measurement event, so that the base station can grasp more information of the user equipment, facilitating the base station to make a better handover decision in subsequent cell handover.

The following describes reporting of a specific measurement event in detail.

Figure 4:
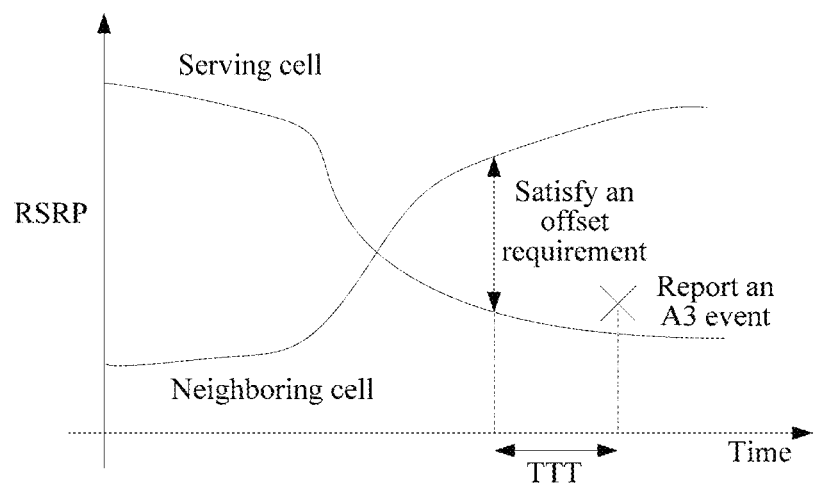
FIG. 4 is a schematic structural diagram of reporting a measurement event according to an embodiment of the present disclosure.

An A3 event is a measurement report event of LTE, and indicates that signal quality of a neighboring cell is better than an offset value (based on a measurement value of reference signal received power (RSRP) or reference signal received quality (RSRQ)) of a current serving cell (which is referred to as a serving cell). As shown in FIG. 4, after the measurement result of the UE satisfies an entry condition of the A3 event for a period of time, namely, a time to trigger (TTT), the A3 event is reported to the base station, to trigger cell handover. The entry condition of the A3 event is as follows:

$Mn+Ofn+Ocn-Hys>Mp+Ofp+Ocp+Off$ where Mn is a measurement result of the neighboring cell, Mp is a measurement result of the serving cell, Ofn is a frequency-related offset value of the neighboring cell, Ofp is a frequency-related offset value of the serving cell, Ocn is a related offset value of the neighboring cell, Ocp is a related offset value of the serving cell, Hys is a hysteresis parameter, Off is a preset offset value of the event, and Mp is the measurement result based on the wide beam.

When the UE is in the beamforming communication mode, the beam gain may be introduced in an existing A3 event, to reflect a current actual measurement result of the UE.

For example, the foregoing formula may be changed to:

$Mn+Ofn+Ocn-Hys>Mp+Ofp+Ocp+Off+\Delta SINR.$

Similarly, a leaving condition of the A3 event may be changed to:

$Mn+Ofn+Ocn+Hys>Mp+Ofp+Ocp+Off+\Delta SINR.$

It should be understood that because the entry condition of the A3 event is changed, the A3 event is no longer an A3 event in the prior art. Therefore, for distinction and ease of description, the A3 event whose entry condition and leaving condition are changed may be referred to as a first event. It should be further understood that the "first event" is an alternative name of an event, but does not constitute any limitation on the scope of the embodiments of the present disclosure.

Similar to the prior art, when the measurement result of the UE satisfies that duration of an entry condition of the first event is greater than a first time to trigger, the UE may report the first event to the base station.

Optionally, the first time to trigger may be a preconfigured TTT.

Optionally, the first time to trigger may be a product of a preconfigured TTT and a speed state scale factor.

Specifically, an excessively small value of the TTT causes frequent reporting of the A3 event, easily resulting in ping-pong handover; and an excessively large value of the TTT causes a delay in reporting of the A3 event, resulting in an untimely handover and a call drop of the UE. Therefore, the TTT is usually set in consideration of both a ping-pong handover rate and a call drop rate of the UE. A moving speed of the UE affects a value of the TTT. For example, when the UE moves rapidly, handover needs to be performed more rapidly, to ensure continuity of data transmission of the UE. Therefore, a speed state scale factor SpeedStateScaleFactor (less than 1) related to a speed is designed in an existing LTE system, to adjust the value of the TTT. A final TTT may be a product of the SpeedStateScaleFactor and the preconfigured TTT.

Optionally, in this embodiment of the present disclosure, similarly, a beam gain scale factor BeamGainStateScaleFactor may alternatively be designed, and the TTT is adjusted by using the beam gain. A final TTT is a product of the BeamGainStateScaleFactor and the preconfigured TTT. In addition, the product of the BeamGainStateScaleFactor and the preconfigured TTT is referred to as a second time to trigger.

A possible implementation method is as follows: First, the gain is divided into several levels based on a value of the beam gain, a gain threshold and/or measurement duration of each level are/is configured by the base station and are/is notified to the UE by using an RRC message. After measuring a level of a current beam gain, the UE may select a BeamGainStateScaleFactor corresponding to the level. That is, the beam gain corresponds to the BeamGainStateScaleFactor. In addition, for each beam gain level, several coefficients can be selected, and a specific coefficient is indicated by the base station. A possible RRC message structure is as follows, where 1Dot0 represents 1.0.

```
-- ASN1START
    BeamGainStateScaleFactors ::= SEQUENCE {
    sf-Medium ENUMERATED {1Dot0, 1Dot5, 2Dot0, 2Dot5},
    sf-High ENUMERATED {1Dot0, 1Dot5, 2Dot0, 2Dot5}
    }
-- ASN1STOP.
```

Therefore, in this embodiment of the present disclosure, when the measurement result of the UE satisfies that duration of the entry condition of the A3 event is greater than a second time to trigger, the UE may report the A3 event to the base station.

In addition, in this embodiment of the present disclosure, when the measurement result of the UE satisfies that duration of the entry condition of the first event is greater than a third time to trigger, the UE may report the A3 event to the base station. The third time to trigger is a product of the beam gain scale factor and the configured TTT. That is, the third time to trigger may be the second time to trigger.

In addition, in this embodiment of the present disclosure, a new report event, for example, a gain event, may further be designed based on the beam gain. The gain event may be a D1 event, a D2 event, or a D3 event. The following describes reporting of the D1 event, the D2 event, and the D3 event in detail.

Optionally, when the beam gain is greater than a first preset threshold, the UE may report the D1 event to the base station.

Specifically, for the UE already in a beam gain communication mode, when the beam gain exceeds a preconfigured threshold, namely, the first preset threshold, the UE may report the D1 event to the base station. After receiving the D1 event reported by the UE, the base station may continue communication with the UE by using the beamforming communication mode.

Optionally, when the beam gain is greater than a second preset threshold, the UE may report the D2 event to the base station.

Specifically, for the UE not in the beamforming communication mode, only a method for reporting an estimated beam gain is used. After obtaining the beam gain by detecting the weighted CSI-RS and when the beam gain exceeds a preconfigured threshold, namely, the second preset threshold, the UE may report the D2 event to the base station. Moreover, the D2 event may trigger the base station to configure the beamforming communication mode for the UE. That is, after receiving the D2 event reported by the UE, the base station may enable the beamforming communication mode, and communicate with the UE by using the beamforming communication mode, to enhance downlink quality.

Optionally, the UE may alternatively report a first identifier and/or the beam gain to the base station. The first identifier is used to identify a CSI-RS port corresponding to the beam gain. In this way, the base station may determine the beamforming communication mode based on the first identifier, and communicate with the UE by using the beamforming communication mode, to enhance downlink quality.

Optionally, when the beam gain is greater than a third preset threshold, the UE may report the D3 event to the base station.

Specifically, the D3 event may be used for the UE not in the beamforming communication mode. When the beam gain is estimated by using the unweighted CRS/CSI-RS and the preconfigured codebook and the beam gain is greater than a configured threshold, namely, the third preset threshold, the UE may report the D3 event to the base station. Similarly, the D3 event may trigger the base station to configure the beamforming communication mode for the UE. That is, after receiving the D3 event reported by the UE, the base station may enable the beamforming communication mode, and communicate with the UE by using the beamforming communication mode, to enhance downlink quality.

Optionally, the UE may alternatively report a second identifier to the base station. The second identifier is used to identify a codebook index corresponding to the channel energy of the narrow beam. In this way, the base station may determine the beamforming communication mode based on the second identifier, and communicate with the UE by using the beamforming communication mode, to enhance downlink quality.

In addition, in addition to reporting of the measurement event, for example, the D2 and D3 events, information of the CSI-RS ports or the codebook index corresponding to the channel energy of the narrow beam may alternatively be directly fed back by using a physical layer channel.

In addition, the foregoing measurement events may be used for a measurement result of the serving cell, or may be used for a measurement result of the neighboring cell. For example, a D4 event may be used to report a measurement result (corresponding to the D2 event) based on a weighted CSI-RS of the neighboring cell, and a D5 event may be used to report a measurement result (corresponding to the D3 event) based on an unweighted CRS/CSI-RS of the neighboring cell.

In this embodiment of the present disclosure, the beam gain is introduced as a decision condition for event reporting and a method for adjusting the TTT, so that reporting of handover is delayed, and a ping-pong handover rate is reduced. Meanwhile, for a manner in which the beam gain is reported, the base station can grasp more information of the UE, helping make a best handover decision.

When the UE reports the D1 event, if the UE reports the A3 event or the first event again, optionally, the base station may immediately send a handover command to the UE, to control handover of the UE from the serving cell to a target cell. In addition, after the UE reports the foregoing events, the base station may alternatively send a handover command to the UE after a preset period of time, to control handover of the UE from the serving cell to a target cell.

Specifically, for the UE already in the beamforming communication mode, if the A3 event and the D1 event are simultaneously reported to the base station, or the first event and the D1 event are simultaneously reported to the base station, or the user equipment enters the A3 event or the first event after entering the D1 event, the base station may delay by a period of time, that is, send the handover command to the UE after a preset period of time T. If the UE reports leaving of the A3 event or the first event in the period of time T, it indicates that the UE leaves a cell edge and returns to a central position of the serving cell again. If the UE does not report leaving of the A3 event in the time T, the base station may configure that the UE starts a handover process. This method can reduce a ping-pong handover probability. In addition, if the A3 event and the D1 event are simultaneously reported to the base station, or the first event and the D1 event are simultaneously reported to the base station, the base station may also immediately trigger handover.

In a conventional handover process, after receiving the handover command sent by the serving cell, the UE immediately stops communication with the serving cell, and starts a random access process for the target cell at the same time. However, in a solution in which the UE simultaneously communicates with the serving cell and the target cell, after receiving the handover command, the UE only starts to perform a random access process of the target cell, and does not interrupt communication with the serving cell. Because UE to be handed over is usually at a cell edge, communication quality is usually poor. Even if the UE simultaneously communicates with two cells, a data rate finally obtained by the UE is not high. In the embodiments of the present disclosure, in a process of cell handover, the base station may still maintain communication with UE by using the beamforming communication mode, to maintain better communication quality in the handover process, and also avoid data interruption.

When the UE reports the D2 event or the D3 event, if the UE reports the A3 event again, optionally, the base station may send the handover command to the UE, to control handover of the UE from the serving cell to the target cell. In the handover process, the base station may enable the beamforming communication mode only for the UE, to enhance downlink transmission quality.

Optionally, the UE may further report the beam gain to the base station.

Optionally, the method further includes: receiving, by the base station, namely, the source base station, a third identifier sent by the user equipment, where the third identifier is used to indicate a second CSI-RS port corresponding to a target base station, the target base station is a base station of the target cell, the second CSI-RS port corresponds to channel energy of a narrow beam of the target cell, a beam gain of the target cell is a ratio of the channel energy of the narrow beam of the target cell to channel energy of a wide beam of the target cell, and the narrow beam of the target cell is a directional beam; and sending, by the source base station, the third identifier to the target base station, so that the target base station determines a second beamforming communication mode based on the third identifier, and communicates with the user equipment by using the second beamforming communication mode.

Specifically, the UE may report a measurement result (including at least the third identifier) of the target cell to the source base station, and the source base station may forward the measurement result to the target base station. In a cell handover process and after the cell handover is completed, the target base station may communicate with the UE based on the measurement result by using the (second) beamforming communication mode.

Optionally, the method may further include: receiving, by the source base station, a fourth identifier sent by the user equipment, where the fourth identifier is used to indicate a second codebook index corresponding to a target base station, the target base station is a base station of the target cell, the second codebook index corresponds to channel energy of a narrow beam of the target cell, a beam gain of the target cell is a ratio of the channel energy of the narrow beam of the target cell to channel energy of a wide beam of the target cell, and the narrow beam of the target cell is a directional beam; and sending, by the source base station, the fourth identifier to the target base station, so that the target base station determines a second beamforming communication mode based on the fourth identifier, and communicates with the user equipment by using the second beamforming communication mode.

Specifically, the UE may report a measurement result (including at least the fourth identifier) of the target cell to the source base station, and the source base station may forward the measurement result to the target base station. In a cell handover process and after the cell handover is completed, the target base station may communicate with the UE based on the measurement result by using the (second) beamforming communication mode.

To be specific, for the target cell, the UE already obtains configuration information about a CRS or a CSI-RS of the neighboring cell through a measurement configuration message about the neighboring cell, and measures the beam gain. The measurement result is forwarded by the source base station, namely, the base station in this embodiment of the present disclosure, to the target base station. Therefore, the target base station may determine a beam most applicable to the UE. In the handover process and after the handover, the target base station may directly use the beam to communicate with the UE.

Optionally, the measurement result may further include the beam gain.

Optionally, the method may further include: receiving, by the user equipment, a first signal sent by the serving cell and a second signal sent by the target cell; obtaining, by the user equipment by performing weighted processing on the first signal by using K preconfigured weight values, channel energy of K third beams that correspond one-to-one to the K preconfigured weight values, and obtaining, by performing weighted processing on the second signal by using the K preconfigured weight values, channel energy of K fourth beams that correspond one-to-one to the K preconfigured weight values, where the K preconfigured weight values correspond one-to-one to K beams, and the K preconfigured weight values are different from each other; determining, by the user equipment, a beam corresponding to a channel energy with a largest value in the channel energies of the K third beams as a first receive beam, and determining a beam corresponding to a channel energy with a largest value in the channel energies of the K fourth beams as a second receive beam; receiving, by the user equipment by using the first receive beam, a signal sent by the serving cell; and/or receiving, by the user equipment by using the second receive beam, a signal sent by the target cell.

Figure 5:
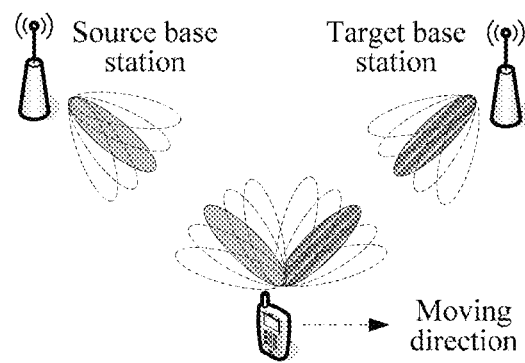
FIG. 5 is a schematic block diagram of communication between user equipment, a source base station, and a target base station according to an embodiment of the present disclosure.

Specifically, the user equipment in handover may receive signals separately sent by the serving cell and the target cell. Because the serving cell and the target cell are in a co-frequency scenario, interference exists between data flows of the two cells. In this case, the UE on a receiving side may alternatively perform receiving in a beam domain, that is, first perform weighted processing on a received signal by using a preconfigured weight value, then perform energy detection, and complete beam selection of a related cell by comparing energy values. As shown in FIG. 5, because the UE is located at a cell edge, there is a relatively large angle between two beams of the target base station and the source base station. In this case, even if there is a relatively small quantity of receive antennas on a UE side, the two beams can be effectively distinguished.

Figure 6:
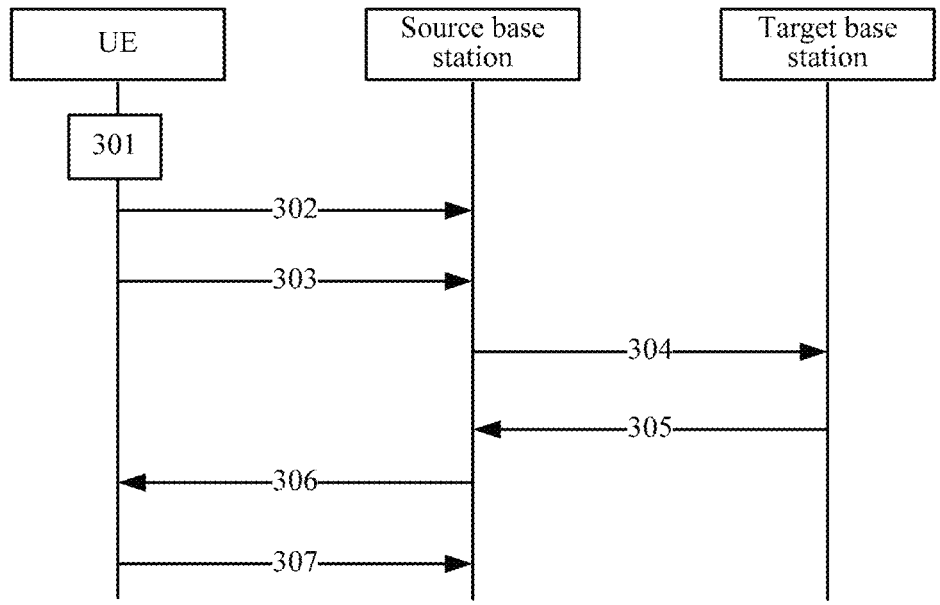
FIG. 6 is a schematic flowchart of a communication method according to an embodiment of the present disclosure.
Figure 7:
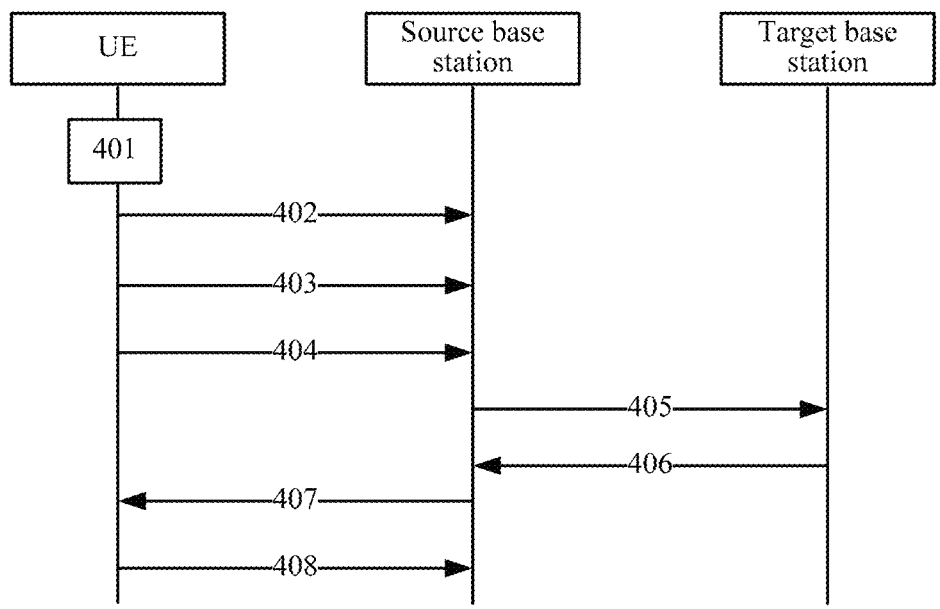
FIG. 7 is a schematic flowchart of a communication method according to an embodiment of the present disclosure.

With reference to FIG. 6 and FIG. 7, a communication method according to an embodiment of the present disclosure is described below in detail. FIG. 6 is a schematic flowchart of a communication method according to an embodiment of the present disclosure.

301. UE measures reference signals of a serving cell and a neighboring cell separately, to obtain measurement results.

Specifically, when the UE is in a beamforming communication mode, the UE may obtain channel energy of a narrow beam of the serving cell by measuring a DMRS; and obtain channel energy of a wide beam of the serving cell and an RSRP and/or an RSRQ of the serving cell by measuring a CRS and/or a CSI-RS of the serving cell, thereby obtaining a beam gain. Meanwhile, the UE may obtain channel energy of a wide beam of the neighboring cell by measuring a CRS and/or a CSI-RS of the neighboring cell, and may estimate channel energy of a narrow beam of the neighboring cell and an RSRP and/or an RSRQ of the neighboring cell, thereby obtaining an estimated beam gain of the neighboring cell.

302. The UE feeds back the measurement results to a source base station. The measurement results include a measurement result of the serving cell and a measurement result of the neighboring cell.

303. The UE reports an A3 event and a D1 event to the source base station, or the UE reports a first event and a D1 event to the source base station.

304. The source base station makes a handover decision. Specifically, the source base station may immediately make the handover decision or make the handover decision after a period of time. When making the handover decision, the source base station may determine a target cell with reference to the measurement result of the neighboring cell. After determining the target cell, the source base station sends a handover (HO) request message to a target base station. The handover request message may include a measurement result of the target cell that is obtained by the UE.

305. A target base station sends an HO request acknowledgement message to the source base station.

306. The source base station sends an HO command to a terminal device. After receiving the HO command, the terminal device is handed over from the serving cell to the target cell. In the handover process, the source base station maintains communication with the UE by using the beamforming communication mode. On one hand, data interruption may be avoided in the handover process. On the other hand, downlink transmission quality may be enhanced.

307. The UE sends an HO complete message. After the handover is completed, the target base station may communicate with the UE by using the beamforming communication mode and based on the measurement result of the target cell that is obtained by the UE and that is in the handover request message of the source base station.

According to the communication method in this embodiment of the present disclosure, the UE calculates the beam gain, facilitating a user to better report the measurement results. Moreover, after obtaining the beam gain, the UE may directly add the beam gain to a corresponding measurement event for decision, for example, a decision condition of an A3 event; or may correct duration TTT of an event related to the beam gain. In both the two methods, a reporting time may be delayed, a ping-pong handover rate may be reduced, and communication between the UE and the source base station may be better maintained. The source base station may be assisted in making the handover decision by reporting the D1 event and the beam gain. Further, in the handover process, the UE simultaneously communicates with the source base station and the target base station by using the beamforming communication mode. A beam domain is used for reception on a UE side. To be specific, signals from the source base station and the target base station are received by using different beams, so that communication quality can be improved.

FIG. 7 is a schematic flowchart of a communication method according to another embodiment of the present disclosure.

401. UE measures reference signals of a serving cell and a neighboring cell separately, to obtain measurement results.

Specifically, when the UE is not in a beamforming communication mode, the UE may estimate channel energy of a narrow beam of the serving cell by measuring a weighted CSI-RS or an unweighted CRS/CSI-RS; and obtain channel energy of a wide beam of the serving cell and an RSRP and/or an RSRQ of the serving cell by measuring an unweighted CRS and/or CSI-RS of the serving cell, thereby estimating a beam gain. Meanwhile, the UE may obtain channel energy of a wide beam of the neighboring cell by measuring a CRS and/or a CSI-RS of the neighboring cell, and may estimate channel energy of a narrow beam of the neighboring cell and an RSRP and/or an RSRQ of the neighboring cell, thereby obtaining an estimated beam gain of the neighboring cell.

402. The UE feeds back the measurement results to a source base station. The measurement results include a measurement result of the serving cell and a measurement result of the neighboring cell.

403. The UE reports a D2 event or a D3 event to the source base station. Specifically, when the beam gain is obtained by measuring the weighted CSI-RS, and the beam gain is greater than a second preset threshold, the UE reports the D2 event to the source base station. When the beam gain is obtained by measuring the unweighted CRS or CSI-RS, and the beam gain is greater than a third preset threshold, the UE reports the D3 event to the source base station.

Optionally, while reporting the D2 event, the UE may further report a CSI-RS port corresponding to the beam gain. Optionally, while reporting the D3 event, the UE may further report a codebook index corresponding to the beam gain.

Optionally, when the base station receives the D2 event or the D3 event, the beamforming communication mode may be enabled only for the UE, thereby enhancing downlink transmission quality. In this case, the source base station may determine, based on the CSI-RS port or the codebook index reported by the UE, a beam for communication with the UE.

404. The UE reports an A3 event to the source base station.

405. The source base station makes a handover decision. Specifically, the source base station may immediately make the handover decision or make the handover decision after a period of time. When making the handover decision, the source base station may determine a target cell with reference to the measurement result of the neighboring cell. After determining the target cell, the source base station sends an HO request message to a target base station. The handover request message may include a measurement result of the target cell that is obtained by the UE.

406. A target base station sends an HO request acknowledgement message to the source base station.

407. The source base station sends an HO command to a terminal device. After receiving the HO command, the terminal device is handed over from the serving cell to the target cell. In the handover process, the beamforming communication mode may be enabled only for the UE, thereby enhancing downlink transmission quality.

408. The UE sends an HO complete message. After the handover is completed, the target base station may communicate with the UE by using the beamforming communication mode and based on the measurement result of the target cell that is obtained by the UE and that is in the handover request message of the source base station.

According to the communication method in this embodiment of the present disclosure, the UE calculates the beam gain, facilitating a user to better report the measurement results. Moreover, the UE estimates an optimal beam (corresponding to the CSI-RS port) or codebook index by measuring the CSI-RS or the CRS of the neighboring cell, and feeds back the optimal beam or codebook index to the source base station. Then, the source base station notifies the target base station of the optimal beam or codebook index. After the handover, beamforming communication mode may be rapidly used on a target base station side, thereby enhancing downlink quality.

It should be noted that in this embodiment of the present disclosure, to avoid detailed description, the process of handing over the UE from the serving cell to the target cell is only briefly described. For a specific handover process, refer to the prior art.

According to an existing protocol, if the base station configures an uplink sending resource (dynamic scheduling or semi-persistent scheduling) for the UE, the UE needs to perform sending on the resource. That is, even if no data needs to be sent, a padding packet also needs to be sent. However, this results in unnecessary uplink interference and resource waste. Therefore, a method for sending a padding skipping packet is already provided currently. That is, when there is no to-be-sent data, the UE does not send the padding packet. Therefore, for the UE, unnecessary power consumption may be reduced, and a higher requirement on detection of the base station is put forward. That is, the base station needs to distinguish whether the UE sends data. In other words, the base station needs to provide a reliable capability in detecting discontinuous transmission (DTX). This increases complexity of detection of the base station.

To resolve the foregoing problem, an embodiment of the present disclosure further provides a communication method.

Figure 8:
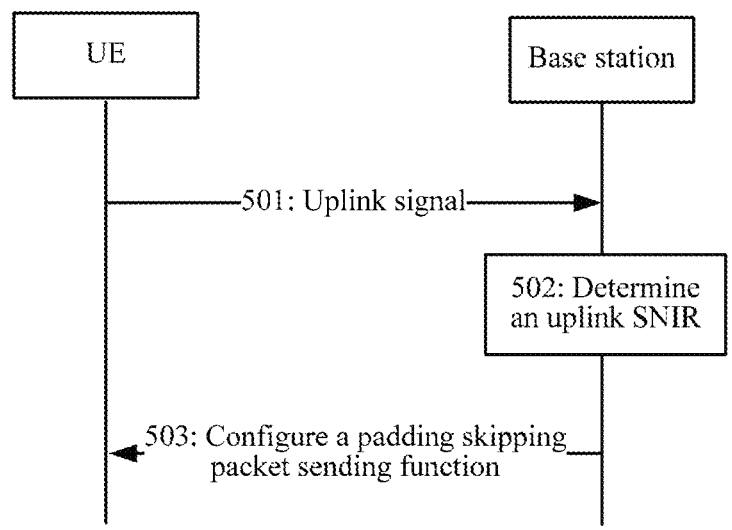
FIG. 8 is a schematic flowchart of a communication method according to an embodiment of the present disclosure.

FIG. 8 is a schematic flowchart of a communication method according to an embodiment of the present disclosure.

501. A base station receives an uplink signal sent by UE.

Optionally, the uplink signal includes at least one of the following signals: a physical random access channel PRACH signal, a physical uplink control channel PUCCH signal, a demodulation reference signal DMRS, and a sounding reference signal SRS.

502. The base station determines an uplink SINR based on the uplink signal.

503. When the uplink SINR is greater than a preset threshold, the base station determines to configure a padding skipping function for the UE.

Optionally, the determining, by the base station, to configure a padding skipping function for the UE includes: configuring, by the base station, the padding skipping function by sending configuration information to the UE.

Specifically, the base station estimates the uplink SINR by using the uplink signal sent by the UE, for example, one or more of the PRACH signal, the PUCCH signal, the DMRS signal, and the SRS signal. If the uplink SINR is greater than the preset threshold, it is considered that the base station can perform a reliable DTX detection. In this case, the base station can configure the padding skipping function for the UE. In other words, when the uplink SINR is less than or equal to the preset threshold, it is considered that the base station cannot perform a reliable DTX detection. In this case, the base station does not configure the padding skipping function for the UE.

In this embodiment of the present disclosure, the base station may determine, by comparing the uplink SINR with the preset threshold, whether to configure the padding skipping function for the UE. In this way, it can be ensured that the padding skipping function is enabled only when an uplink SINR is high, to ensure reliability of DTX detection.

Figure 9:
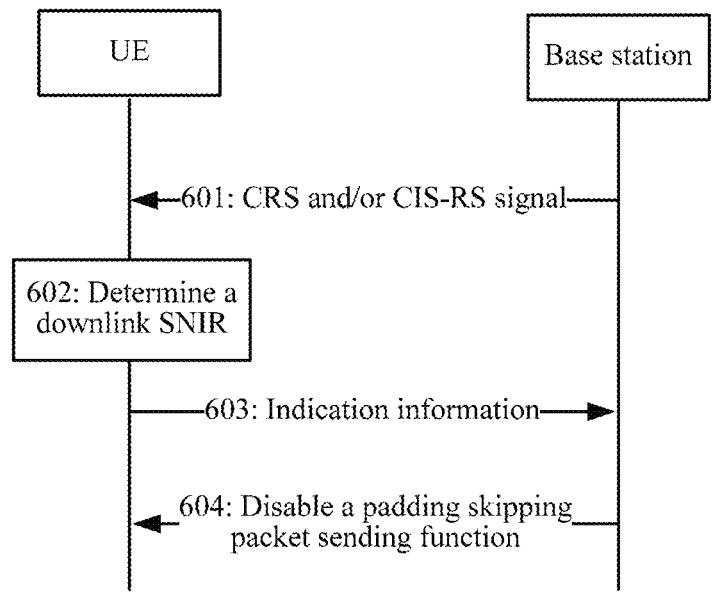
FIG. 9 is a schematic flowchart of a communication method according to another embodiment of the present disclosure.

FIG. 9 is a schematic flowchart of a communication method according to another embodiment of the present disclosure.

601. UE receives a cell reference signal CRS and/or a channel state information reference signal CSI-RS that are/is sent by a base station.

602. The UE determines a downlink SINR by measuring the CRS and/or the CSI-RS.

603. When the downlink SINR is less than a preset threshold, the UE sends indication information to the base station, where the indication information is used to instruct the base station to disable a padding skipping function of the UE.

604. The base station disables the padding skipping function of the UE based on the indication information.

Specifically, when the padding skipping function is already enabled, the UE measures a downlink CRS and/or CSI-RS, and calculates the downlink SINR. If the downlink SINR is less than the preset threshold, it is considered that an uplink SINR is also relatively small. In this case, the UE may send the indication information to the base station. After receiving the indication information, the base station may disable the padding skipping function of the UE.

In this embodiment of the present disclosure, after the padding skipping function of the UE is enabled, if the downlink SINR of the UE is less than the preset threshold, that is, the UE enters a low downlink SINR state, it is considered that the UE is also in a low uplink SINR state. In this case, the UE may instruct the base station to disable the padding skipping function of the UE by sending the indication information to the base station. In this way, it can be ensured that the padding skipping function is enabled only when an uplink SINR is high, to ensure reliability of DTX detection.

Optionally, before 601, the method further includes: receiving, by the UE, a Radio Resource Control RRC message sent by the base station, where the RRC message includes the preset threshold. That is, the preset threshold may be configured by the base station.

Optionally, the sending, by the UE, indication information to the base station includes: sending, by the UE, a padding (padding) packet to the base station when there is no to-be-sent data.

Specifically, if the downlink SINR is less than the preset threshold, when there is no data to be sent by the UE, the UE may send the padding packet on a configured uplink resource. When receiving the padding packet, the base station may learn that the downlink SINR is less than the preset threshold. In this case, the base station may disable the padding skipping function of the UE.

Optionally, the sending, by the UE, indication information to the base station includes: sending, by the UE, a MAC CE to the base station, where the MAC CE indicates that the downlink SINR is less than or equal to the preset threshold.

Specifically, if the downlink SINR is less than the preset threshold, the UE may send the MAC CE to the base station. When receiving the MAC CE, the base station may learn that the downlink SINR is less than the preset threshold. In this case, the base station may disable the padding skipping function of the UE.

Optionally, the sending, by the UE, indication information to the base station includes: sending, by the UE, particular information by using a PUCCH, where the particular information includes at least one of an SR, an ACK, an NACK, and a CQI, and the CQI is obtained by the user equipment by measuring the CRS and/or the CSI-RS.

Specifically, if the downlink SINR is less than the preset threshold, the UE may send the particular information to the base station, for example, send the SR, the ACK, or the NACK to the base station. In addition, the UE may further send, to the base station, the CQI obtained by measuring the CRS and/or the CSI-RS. When receiving the particular information, the base station may learn that the downlink SINR is less than the preset threshold. In this case, the base station may disable the padding skipping function of the UE.

In this way, it can be ensured that the padding skipping function is disabled for a downlink SINR, and the padding skipping function is enabled only for an uplink SINR, to ensure reliability of the DTX detection.

The communication method according to the embodiments of the present disclosure is described above in detail with reference to FIG. 1 to FIG. 9. User equipment (UE) and a base station according to the embodiments of the present disclosure are described below with reference to FIG. 10 to FIG. 14.

Figure 10:
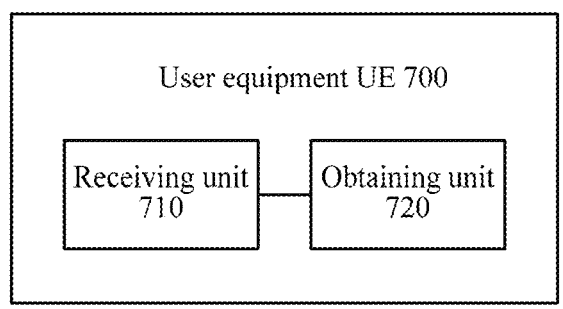
FIG. 10 is a schematic block diagram of user equipment according to an embodiment of the present disclosure.

FIG. 10 is a schematic block diagram of UE 700 according to an embodiment of the present disclosure. As shown in FIG. 10, the UE includes a receiving unit 710 and an obtaining unit 720.

The receiving unit 710 is configured to receive a reference signal sent by a base station.

The obtaining unit 720 is configured to obtain channel energy of a narrow beam by measuring the reference signal received by the receiving unit 710, where the narrow beam is a directional beam.

Each unit and the foregoing another operation or function of the UE 700 according to this embodiment of the present disclosure is used for implementing a corresponding process corresponding to the UE in the foregoing method. For brevity, details are not described herein again.

Therefore, in this embodiment of the present disclosure, the UE may obtain the channel energy of the narrow beam by measuring the reference signal. Compared with the prior art in which channel energy of a narrow beam is measured on a base station side, a difference is that the UE can more accurately estimate the channel energy of the narrow beam. That is, the channel energy of the narrow beam estimated by the UE can more accurately reflect channel quality, and transmission efficiency can be improved.

Figure 11:
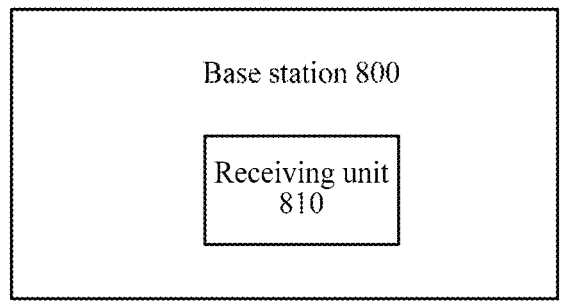
FIG. 11 is a schematic block diagram of a base station according to an embodiment of the present disclosure.

FIG. 11 is a schematic block diagram of a base station 800 according to an embodiment of the present disclosure. As shown in FIG. 11, the base station 800 includes a receiving unit 810.

The receiving unit 810 is configured to receive a gain event reported by user equipment, where the gain event indicates that a beam gain of a serving cell is greater than a preset threshold, the base station is a base station of the serving cell, the beam gain of the serving cell is a ratio of channel energy of a narrow beam of the serving cell to channel energy of a wide beam of the serving cell, and the narrow beam of the serving cell is a directional beam.

Units and the foregoing and other operations or functions of the base station 800 according to this embodiment of the present disclosure are respectively used for implementing corresponding processes corresponding to the base station (a source base station) in the foregoing method. For brevity, details are not described herein again.

According to the method in this embodiment of the present disclosure, the beam gain is introduced in reporting of a measurement event, so that the source base station can grasp more information of the user equipment, facilitating the source base station to make a better handover decision in subsequent cell handover.

Figure 12:
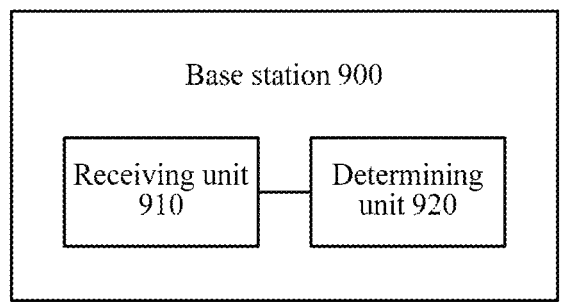
FIG. 12 is a schematic block diagram of a base station according to an embodiment of the present disclosure.

FIG. 12 is a schematic block diagram of a base station 900 according to an embodiment of the present disclosure. As shown in FIG. 12, the base station 900 includes a receiving unit 910 and a determining unit 920.

The receiving unit 910 is configured to receive an uplink signal sent by user equipment.

The determining unit 920 is configured to determine an uplink SINR based on the uplink signal.

The determining unit 920 is further configured to: when the uplink SINR is greater than a preset threshold, determine to configure a padding skipping function for the user equipment.

Units and the foregoing and other operations or functions of the base station 900 according to this embodiment of the present disclosure are used for implementing corresponding processes corresponding to the base station in the method shown in FIG. 8. For brevity, details are not described herein again.

In this embodiment of the present disclosure, the base station may determine, by comparing the uplink SINR with the preset threshold, whether to configure the padding skipping function for the user equipment. In this way, it can be ensured that the padding skipping function is enabled only when the uplink SINR is high, to ensure reliability of discontinuous transmission DTX detection.

Figure 13:
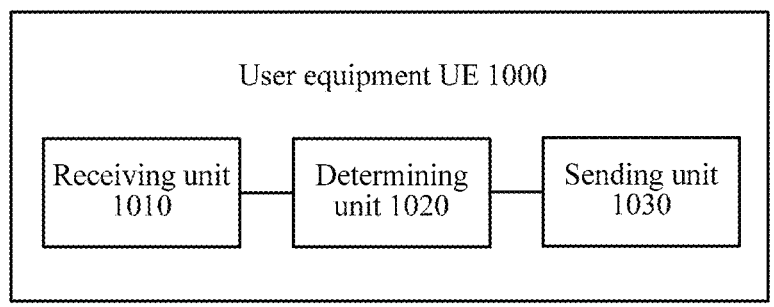
FIG. 13 is a schematic block diagram of user equipment according to an embodiment of the present disclosure.

FIG. 13 is a schematic block diagram of user equipment (UE) 1000 according to an embodiment of the present disclosure. As shown in FIG. 13, the UE 1000 includes a receiving unit 1010, a determining unit 1020, and a sending unit 1030.

The receiving unit 1010 is configured to receive a cell-specific reference signal CRS and/or a channel state information reference signal CSI-RS that are/is sent by a base station.

The determining unit 1020 is configured to determine a downlink SINR by measuring the CRS and/or the CSI-RS.

The sending unit 1030 is configured to: when the downlink SINR is less than a preset threshold, sends indication information to the base station, and the indication information is used to instruct the base station to disable a padding skipping function of the user equipment.

Each unit and the foregoing another operation or function of the UE 1000 according to this embodiment of the present disclosure is used for implementing a corresponding process corresponding to the UE in the method shown in FIG. 9. For brevity, details are not described herein again.

In this embodiment of the present disclosure, after the padding skipping function of the user equipment is enabled, if the downlink SINR of the user equipment is less than the preset threshold, that is, the user equipment enters a low downlink SINR state, it is considered that the user equipment is also in a low uplink SINR state. In this case, the user equipment may instruct the base station to disable the padding skipping function of the user equipment by sending the indication information to the base station. In this way, it can be ensured that the padding skipping function is enabled only when an uplink SINR is high, to ensure reliability of DTX detection.

Figure 14:
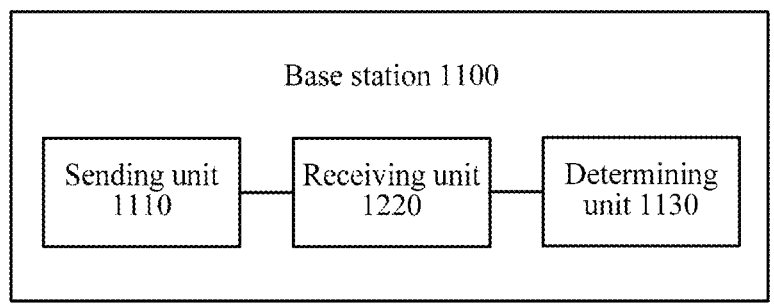
FIG. 14 is a schematic block diagram of a base station according to an embodiment of the present disclosure.

FIG. 14 is a schematic block diagram of a base station 1100 according to an embodiment of the present disclosure. As shown in FIG. 14, the base station 1100 includes a sending unit 1110, a receiving unit 1120, and a determining unit 1130.

The sending unit 1110 is configured to send a cell reference signal CRS and/or a channel state information reference signal to user equipment.

The receiving unit 1120 is configured to receive indication information sent by the user equipment based on the CRS and/or the CSI-RS.

The determining unit 1130 is configured to determine, based on the indication information, to disable a padding skipping function of the user equipment.

Units and the foregoing and other operations or functions of the base station 1100 according to this embodiment of the present disclosure are used for implementing corresponding processes corresponding to the base station in the method shown in FIG. 9. For brevity, details are not described herein again.

User equipment (UE) and a base station according to other embodiments of the present disclosure are described below with reference to FIG. 15 to FIG. 19.

Figure 15:
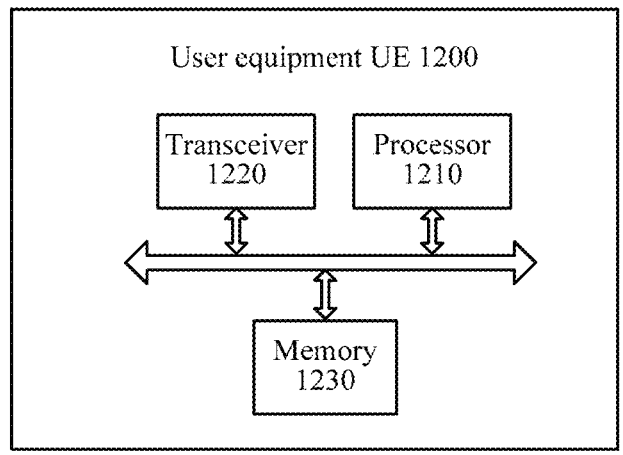
FIG. 15 is a schematic structural diagram of user equipment according to an embodiment of the present disclosure.

FIG. 15 is a schematic block diagram of UE 1200 according to an embodiment of the present disclosure.

As shown in FIG. 15, the UE 1200 includes a processor 1210, a transceiver 1220, and a memory 1230. The memory 1230 is configured to store an instruction. The processor 1210 is configured to perform the instruction stored in the memory 1230. When the processor 1210 executes the instruction stored in the memory 1230, the transceiver 1220 is configured to receive a reference signal sent by a base station; and the processor 1210 is configured to obtain channel energy of a narrow beam by measuring the reference signal received by the transceiver 1220, where the narrow beam is a directional beam.

It should be understood that the processor 1210 in this embodiment of the present disclosure may be a central processing unit (CPU), or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor or the processor may be any conventional processor, or the like.

The memory 1230 may include a read-only memory and a random access memory, and provide an instruction and data to the processor 1210. A part of the memory 1230 may further include a non-volatile random access memory. For example, the storage 1230 may further store information about a device type.

In an implementation process, each step of the foregoing method may be completed by using an integrated logical circuit of hardware in the processor 1210 or an instruction in a form of software. The steps of the communication method disclosed with reference to the embodiments of the present disclosure may be directly performed and completed by using a hardware processor, or may be performed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 1230, and the processor 1210 reads information in the memory 1230 and implements the steps of the foregoing method in combination with hardware of the processor 1210. To avoid repetition, details are not described herein again.

Each unit and the foregoing another operation or function of the UE 1200 according to this embodiment of the present disclosure is used for implementing a corresponding process corresponding to the UE in the foregoing method. For brevity, details are not described herein again.

Therefore, in this embodiment of the present disclosure, the UE may obtain the channel energy of the narrow beam by measuring the reference signal. Compared with the prior art in which channel energy of a narrow beam is measured on a base station side, a difference is that the UE can more accurately estimate the channel energy of the narrow beam. That is, the channel energy of the narrow beam estimated by the UE can more accurately reflect channel quality, and transmission efficiency can be improved.

Figure 16:
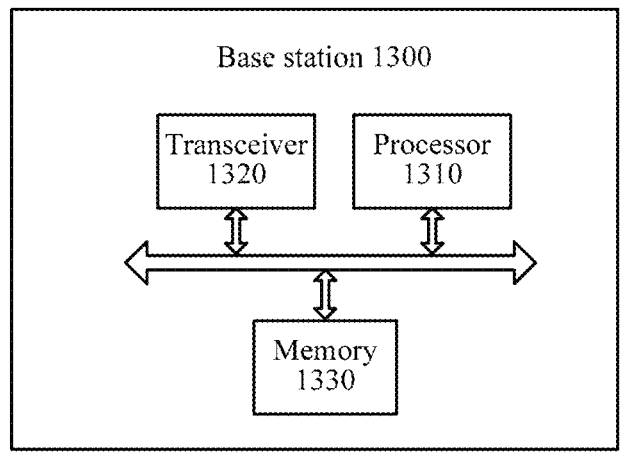
FIG. 16 is a schematic structural diagram of a base station according to an embodiment of the present disclosure.

FIG. 16 is a schematic block diagram of a base station 1300 according to an embodiment of the present disclosure.

As shown in FIG. 16, the base station 1300 includes a processor 1310, a transceiver 1320, and a memory 1330. The memory 1330 is configured to store an instruction. The processor 1310 is configured to perform the instruction stored in the memory 1330. When the processor 1310 executes the instruction stored in the memory 1330, the transceiver 1320 is configured to receive a gain event reported by user equipment, where the gain event indicates that a beam gain of a serving cell is greater than a preset threshold, the base station is a base station of the serving cell, the beam gain of the serving cell is a ratio of channel energy of a narrow beam of the serving cell to channel energy of a wide beam of the serving cell, and the narrow beam of the serving cell is a directional beam.

It should be understood that, the processor 1310 in this embodiment of the present disclosure may be a central processing unit (CPU), or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor or the processor may be any conventional processor, or the like.

The memory 1330 may include a read-only memory and a random access memory, and provide an instruction and data to the processor 1310. A part of the memory 1330 may further include a non-volatile random access memory. For example, the storage 1330 may further store information about a device type.

In an implementation process, each step of the foregoing method may be completed by using an integrated logical circuit of hardware in the processor 1310 or an instruction in a form of software. The steps of the communication method disclosed with reference to the embodiments of the present disclosure may be directly performed and completed by using a hardware processor, or may be performed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 1330, and the processor 1310 reads information in the memory 1330 and implements the steps of the foregoing method in combination with hardware of the processor 1310. To avoid repetition, details are not described herein again.

Units and the foregoing and other operations or functions of the base station 1300 according to this embodiment of the present disclosure are used for implementing corresponding processes corresponding to the base station (a source base station) in the foregoing method. For brevity, details are not described herein again.

According to the method in the embodiment of the present disclosure, the beam gain is introduced in reporting of a measurement event, so that the source base station can grasp more information of the user equipment, facilitating the source base station to make a better handover decision in subsequent cell handover.

Figure 17:
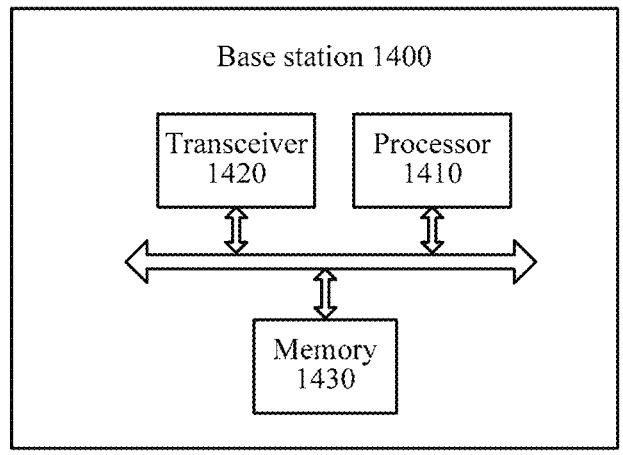
FIG. 17 is a schematic structural diagram of a base station according to an embodiment of the present disclosure.

FIG. 17 is a schematic block diagram of a base station 1400 according to an embodiment of the present disclosure.

As shown in FIG. 17, the base station 1400 includes a processor 1410, a transceiver 1420, and a memory 1430. The memory 1430 is configured to store an instruction. The processor 1410 is configured to perform the instruction stored in the memory 1430. When the processor 1410 executes the instruction stored in the memory 1430, the transceiver 1420 is configured to receive an uplink signal sent by user equipment;

the processor 1410 is configured to determine an uplink SINR based on the uplink signal; and the processor 1410 is further configured to: when the uplink SINR is greater than a preset threshold, determine to configure a padding skipping function for the user equipment.

It should be understood that, the processor 1410 in this embodiment of the present disclosure may be a central processing unit (CPU), or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor or the processor may be any conventional processor, or the like.

The memory 1430 may include a read-only memory and a random access memory, and provide an instruction and data to the processor 1410. A part of the memory 1430 may further include a non-volatile random access memory. For example, the storage 1430 may further store information about a device type.

In an implementation process, each step of the foregoing method may be completed by using an integrated logical circuit of hardware in the processor 1410 or an instruction in a form of software. The steps of the communication method disclosed with reference to the embodiments of the present disclosure may be directly performed and completed by using a hardware processor, or may be performed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 1430, and the processor 1410 reads information in the memory 1430 and implements the steps of the foregoing method in combination with hardware of the processor 1410. To avoid repetition, details are not described herein again.

Units and the foregoing and other operations or functions of the base station 1400 according to this embodiment of the present disclosure are used for implementing corresponding processes corresponding to the base station in the method shown in FIG. 8. For brevity, details are not described herein again.

In this embodiment of the present disclosure, the base station may determine, by comparing the uplink SINR with the preset threshold, whether to configure the padding skipping function for the user equipment. In this way, it can be ensured that the padding skipping function is enabled only when the uplink SINR is high, to ensure reliability of discontinuous transmission DTX detection.

Figure 18:
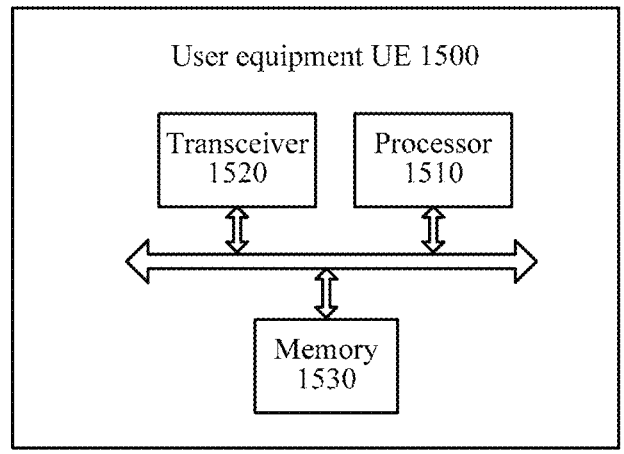
FIG. 18 is a schematic structural block diagram of user equipment according to an embodiment of the present disclosure.

FIG. 18 is a schematic block diagram of user equipment (UE) 1500 according to an embodiment of the present disclosure.

As shown in FIG. 18, the UE 1500 includes a processor 1510, a transceiver 1520, and a memory 1530. The memory 1530 is configured to store an instruction. The processor 1510 is configured to perform the instruction stored in the memory 1530. When the processor 1510 executes the instruction stored in the memory 1530, the transceiver 1520 is configured to receive a cell-specific reference signal CRS and/or a channel state information reference signal CSI-RS that are/is sent by a base station;

the processor 1510 is configured to determine a downlink SINR by measuring the CRS and/or the CSI-RS; and the transceiver 1520 is configured to: when the downlink SINR is less than a preset threshold, sends indication information to the base station, and the indication information is used to instruct the base station to disable a padding skipping function of the user equipment.

It should be understood that, the processor 1510 in this embodiment of the present disclosure may be a central processing unit (CPU), or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor or the processor may be any conventional processor, or the like.

The memory 1530 may include a read-only memory and a random access memory, and provide an instruction and data to the processor 1510. A part of the memory 1530 may further include a non-volatile random access memory. For example, the memory 1530 may further store information about a device type.

In an implementation process, each step of the foregoing method may be completed by using an integrated logical circuit of hardware in the processor 1510 or an instruction in a form of software. The steps of the communication method disclosed with reference to the embodiments of the present disclosure may be directly performed and completed by using a hardware processor, or may be performed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 1530, and the processor 1510 reads information in the memory 1530 and implements the steps of the foregoing method in combination with hardware of the processor 1510. To avoid repetition, details are not described herein again.

Each unit and the foregoing another operation or function of the UE 1500 according to this embodiment of the present disclosure is used for implementing a corresponding process corresponding to the UE in the method shown in FIG. 9. For brevity, details are not described herein again.

In this embodiment of the present disclosure, after the padding skipping function of the user equipment is enabled, if the downlink SINR of the user equipment is less than the preset threshold, that is, the user equipment enters a low downlink SINR state, it is considered that the user equipment is also in a low uplink SINR state. In this case, the user equipment may instruct the base station to disable the padding skipping function of the user equipment by sending the indication information to the base station. In this way, it can be ensured that the padding skipping function is enabled only when an uplink SINR is high, to ensure reliability of DTX detection.

Figure 19:
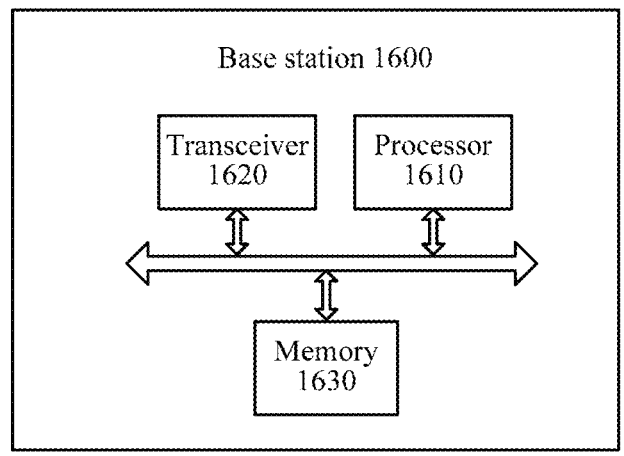
FIG. 19 is a schematic structural diagram of a base station according to an embodiment of the present disclosure.

FIG. 19 is a schematic block diagram of a base station 1600 according to an embodiment of the present disclosure.

As shown in FIG. 19, the base station 1600 includes a processor 1610, a transceiver 1620, and a memory 1630. The memory 1630 is configured to store an instruction. The processor 1610 is configured to perform the instruction stored in the memory 1630. When the processor 1610 executes the instruction stored in the memory 1630, the transceiver 1620 is configured to send a cell reference signal CRS and/or a channel state information reference signal to user equipment;

the processor 1620 is further configured to receive indication information sent by the user equipment based on the CRS and/or the CSI-RS; and the processor 1610 is configured to determine, based on the indication information, to disable a padding skipping function of the user equipment.

It should be understood that, the processor 1610 in this embodiment of the present disclosure may be a central processing unit (CPU), or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor or the processor may be any conventional processor, or the like.

The memory 1630 may include a read-only memory and a random access memory, and provide an instruction and data to the processor 1610. A part of the memory 1630 may further include a non-volatile random access memory. For example, the storage 1630 may further store information about a device type.

In an implementation process, each step of the foregoing method may be completed by using an integrated logical circuit of hardware in the processor 1610 or an instruction in a form of software. The steps of the communication method disclosed with reference to the embodiments of the present disclosure may be directly performed and completed by using a hardware processor, or may be performed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 1630, and the processor 1610 reads information in the memory 1630 and implements the steps of the foregoing method in combination with hardware of the processor 1610. To avoid repetition, details are not described herein again.

Units and the foregoing and other operations or functions of the base station 1600 according to this embodiment of the present disclosure are used for implementing corresponding processes corresponding to the base station in the method shown in FIG. 9. For brevity, details are not described herein again.

It should be understood that sequence numbers of the foregoing processes do not mean execution sequences in various embodiments of the present disclosure. The execution sequences of the processes should be determined based on functions and internal logic of the processes, and should not be construed as any limitation on the implementation processes of the embodiments of the present disclosure.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other divisions during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of the present disclosure. The foregoing storage medium includes various media that can store program code, such as a USB flash drive, a removable hard disk, a read-only memory (ROM), a random access memory (RAM), a magnetic disk, or an optical disc.

The descriptions are only specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A communication method, comprising:
receiving, by a terminal, a reference signal sent by a base station; and obtaining, by the terminal, channel energy of a narrow beam by measuring the reference signal, wherein the narrow beam is a directional beam;

obtaining, by the terminal, channel energy of a wide beam by measuring an unweighted cell-specific reference signal (CRS) or an unweighted channel state information reference signal (CSI-RS); and obtaining, by the terminal, a beam gain, wherein the beam gain is a ratio of the channel energy of the narrow beam to the channel energy of the wide beam.

2. The method according to claim 1, wherein the reference signal is a demodulation reference signal (DMRS).

3. The method according to claim 1, wherein:
receiving, by a terminal, a reference signal sent by a base station comprises:
  receiving, by the terminal, channel state information reference signals (CSI-RS)s that are sent by the base station by using N CSI-RS ports and that are respectively weighted by using N weight values, wherein:
    the N CSI-RS ports correspond one-to-one to the N weight values,
    the N weight values are different from each other; and
    the N weight values correspond one-to-one to beams in N directions; and
obtaining, by the terminal, channel energy of a narrow beam by measuring the reference signal comprises:
  obtaining, by the terminal, channel energy of N first beams by measuring the CSI-RSs that are weighted by using the N weight values; and
  determining, by the terminal, a channel energy with a largest value in the channel energies of the N first beams as the channel energy of the narrow beam.

4. The method according to claim 1, wherein:
receiving, by terminal, a reference signal sent by a base station comprises:
  receiving, by the terminal, an unweighted cell-specific reference signal (CRS) and/or an unweighted channel state information reference signal (CSI-RS) transmitted by the base station by using each antenna; and
obtaining, by the terminal, channel energy of a narrow beam by measuring the reference signal comprises:
  obtaining, by the terminal, a channel estimation value of each antenna by measuring the unweighted CRS and/or the unweighted CSI-RS;
  obtaining, by the terminal by performing a multiplication operation on the channel estimation values and each of M weight values in a preset codebook, channel energy of M second beams that correspond one-to-one to the M weight values; and
  determining, by the terminal, a channel energy with a largest value in the channel energies of the M second beams as the channel energy of the narrow beam.

5. The method according to claim 1, further comprising:
reporting, by the terminal, a beam gain (D1) event to the base station, wherein the beam gain (D1) event indicates that the beam gain is greater than a first preset threshold.

6. The method according to claim 1, wherein:
reporting, by the terminal, a beam gain (D1) event to the base station, wherein the beam gain (D1) event indicates that the beam gain is greater than a first preset threshold.

7. The method according to claim 1, wherein:
reporting, by the terminal, a first event to the base station when the beam gain satisfies that a duration of an entry condition of a first event is greater than a first time to trigger (TTT), wherein:
  the first TTT is a preconfigured TTT; and
  the entry condition of the first event is determined by the terminal based on the beam gain.

8. A communication method, comprising:
receiving, by a source base station, a gain event reported by a terminal, wherein:
  the gain event indicates that a beam gain of a serving cell is greater than a preset threshold;
  the source base station is a base station of the serving cell;
  the beam gain of the serving cell is a ratio of channel energy of a narrow beam of the serving cell to channel energy of a wide beam of the serving cell; and
  the narrow beam of the serving cell is a directional beam.

9. The method according to claim 8, further comprising:
receiving, by the source base station, a measurement report (A3) event reported by the terminal; and
sending, by the source base station, a handover command to the terminal after a preset time period based on the measurement report (A3) event, to control handover of the terminal from the serving cell to a target cell.

10. The method according to claim 9, wherein an entry condition of the measurement report (A3) event is determined by the terminal based on the beam gain.

11. The method according to claim 8, further comprising:
communicating, by the source base station, with the terminal by using a first beamforming communication mode in a process of handover of the terminal from the serving cell to a target cell, wherein the serving cell is neighboring to the target cell.

12. The method according to claim 11, wherein:
before sending, by the source base station, a handover command to the terminal, the method further comprises:
  receiving, by the source base station, a first identifier sent by the terminal, wherein:
    the first identifier is used to indicate a first channel state information reference signal (CSI-RS) port corresponding to the source base station; and
    the first CSI-RS port corresponds to the channel energy of the narrow beam of the serving cell; and
before communicating, by the source base station, with the terminal by using a first beamforming communication mode, the method further comprises:
  determining, by the source base station, the first beamforming communication mode based on the first identifier.

13. The method according to claim 11, wherein:
before sending, by the source base station, a handover command to the terminal, the method further comprises:
  receiving, by the source base station, a second identifier sent by the terminal, wherein:
    the second identifier is used to indicate a first codebook index; and
    the first codebook index corresponds to the channel energy of the narrow beam of the serving cell; and
before communicating, by the source base station, with the terminal by using a first beamforming communication mode, the method further comprises:

determining, by the source base station, the first beamforming communication mode based on the second identifier.

14. A terminal, comprising:

a transceiver, configured to receive a reference signal sent by a base station; and a processor, configured to:
obtain channel energy of a narrow beam by measuring the reference signal received by the transceiver, wherein the narrow beam is a directional beam;

obtain channel energy of a wide beam by measuring an unweighted cell-specific reference signal (CRS) or an unweighted channel state information reference signal (CSI-RS); and obtain a beam gain, wherein the beam gain is a ratio of the channel energy of the narrow beam to the channel energy of the wide beam.

15. The terminal according to claim 14, wherein the reference signal is a demodulation reference signal (DMRS).

16. The terminal according to claim 14, wherein:

the transceiver is configured to:
receive channel state information reference signals (CSI-RSs) that are sent by the base station by using N CSI-RS ports and that are respectively weighted by using N weight values, wherein:
the N CSI-RS ports correspond one-to-one to the N weight values, the N weight values are different from each other; and
the N weight values correspond one-to-one to beams in N directions; and the processor is configured to:
obtain channel energy of N first beams by measuring the CSI-RSs that are weighted by using the N weight values; and
determine a channel energy with a largest value in the channel energies of the N first beams as the channel energy of the narrow beam.

17. The terminal according to claim 14, wherein:

the transceiver is configured to:
receive an unweighted cell-specific reference signal (CRS) and/or an unweighted channel state information reference signal (CSI-RS) that are/is transmitted by the base station by using each antenna; and the processor is configured to:
obtain a channel estimation value of each antenna by measuring the unweighted CRS and/or the unweighted CSI-RS;
obtain, by performing a multiplication operation on the channel estimation values and each of M weight values in a preset codebook, channel energy of M second beams that correspond one-to-one to the M weight values; and
determine a channel energy with a largest value in the channel energies of the M second beams as the channel energy of the narrow beam.

18. The terminal according to claim 14, wherein the transceiver is further configured to:
report a beam gain (D1) event to the base station, wherein the beam gain (D1) event indicates that the beam gain is greater than a first preset threshold.

19. The terminal according to claim 14, wherein the transceiver is further configured to:
when the beam gain satisfies that duration of an entry condition of a first event is greater than a first time to trigger (TTT), report the first event to the base station, wherein:
the first TTT is a preconfigured TTT; and
the entry condition of the first event is determined by the terminal based on the beam gain.

20. The terminal according to claim 14, wherein the transceiver is further configured to:
when the beam gain satisfies that a duration of an entry condition of a measurement report (A3) event is greater than a second time to trigger (TTT), report the measurement report (A3) event to the base station, wherein the second TTT is a product of a beam gain scale factor and a preconfigured TTT, and the beam gain scale factor corresponds to the beam gain.

* * * * *